United States Patent
Nakashima et al.

(10) Patent No.: US 10,821,878 B2
(45) Date of Patent: Nov. 3, 2020

(54) LIGHT PATTERN DRAWING DEVICE FOR ALIGNING ILLUMINATED AREAS OUTSIDE OF VEHICLE

(71) Applicant: STANLEY ELECTRIC CO., LTD., Tokyo (JP)

(72) Inventors: Wataru Nakashima, Tokyo (JP); Yasushi Kita, Tokyo (JP); Takako Kimura, Osaka (JP); Takeshi Waragaya, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/168,912

(22) Filed: Oct. 24, 2018

(65) Prior Publication Data

US 2019/0118698 A1    Apr. 25, 2019

(30) Foreign Application Priority Data

Oct. 24, 2017   (JP) ................................. 2017-205287

(51) Int. Cl.
*B60Q 1/06* (2006.01)
*F21S 41/125* (2018.01)
(Continued)

(52) U.S. Cl.
CPC ................. *B60Q 1/06* (2013.01); *B60Q 1/26* (2013.01); *F21S 41/125* (2018.01);
(Continued)

(58) Field of Classification Search
CPC ......................... B60Q 1/06; B60Q 1/068–085; B60Q 1/2607; B60Q 2200/38; B60Q 2300/05;
(Continued)

(56) References Cited

U.S. PATENT DOCUMENTS

| 10,293,745 B2 * | 5/2019 | Vargas Rivero ....... B60Q 1/085 |
| 2003/0031020 A1 * | 2/2003 | Komatsu ................. B60Q 1/12 362/465 |

(Continued)

FOREIGN PATENT DOCUMENTS

| DE | 10 2016 106 649 A1 | 10/2017 |
| FR | 3 019 266 A1 | 10/2015 |

(Continued)

OTHER PUBLICATIONS

The extended European Search Report for the related European Patent Application No. 18202391.1 dated Feb. 28, 2019.

*Primary Examiner* — Evan P Dzierzynski
*Assistant Examiner* — Keith G. Delahoussaye
(74) *Attorney, Agent, or Firm* — Kenealy Vaidya LLP

(57) ABSTRACT

An illumination device capable of correcting a deviation of a drawing position when drawing is performed at a position deviated from a designed target position on a road surface is provided. The illumination device can include: a first irradiation unit configured to irradiate light having a first light distribution pattern; and a second irradiation unit configured to irradiate light having a second light distribution pattern different from the first light distribution pattern, wherein at least one of the first light distribution pattern and the second light distribution pattern includes a main pattern and an auxiliary pattern configured to have an assisting function.

14 Claims, 14 Drawing Sheets

(51) Int. Cl.
*B60Q 1/26* (2006.01)
*G01M 11/06* (2006.01)

(52) U.S. Cl.
CPC ....... *G01M 11/065* (2013.01); *B60Q 2300/05* (2013.01); *B60Q 2400/50* (2013.01)

(58) Field of Classification Search
CPC ............ B60Q 2400/50; G01M 11/065; G01M 11/066
See application file for complete search history.

(56) References Cited

U.S. PATENT DOCUMENTS

| | | | | |
|---|---|---|---|---|
| 2003/0107898 | A1* | 6/2003 | Smith | B60Q 1/10 |
| | | | | 362/465 |
| 2013/0286672 | A1* | 10/2013 | Godecker | G01M 11/068 |
| | | | | 362/466 |
| 2017/0043705 | A1 | 2/2017 | Mizuno | |
| 2017/0158112 | A1 | 6/2017 | Mouri et al. | |
| 2019/0001868 | A1* | 1/2019 | Kaino | B60Q 1/1423 |

FOREIGN PATENT DOCUMENTS

| | | |
|---|---|---|
| JP | 2017-107690 A | 6/2017 |
| WO | 2015/193714 A1 | 12/2015 |

\* cited by examiner

LIGHT PATTERN DRAWING DEVICE FOR ALIGNING ILLUMINATED AREAS OUTSIDE OF VEHICLE

This application claims the priority benefit under 35 U.S.C. § 119 of Japanese Patent Application No. 2017-205287 filed on Oct. 24, 2017, which is hereby incorporated in its entirety by reference.

TECHNICAL FIELD

The presently disclosed subject matter relates to an illumination device which may be used for a vehicular headlight, for example. Furthermore, the presently disclosed subject matter also relates to a pattern-drawing apparatus, a vehicle periphery illumination device, and the like.

BACKGROUND ART

A technique of drawing on a road surface by irradiating light from a vehicular headlamp has been known (see, for example, Japanese Patent Application Laid-Open No. 2017-107690, which corresponds to U.S. patent application publication No. 2017158112A1). In the technique described in Japanese Patent Application Laid-Open No. 2017-107690, a road surface drawing unit can irradiate the road surface with first light to form a first light distribution pattern. At the same time, a second light distribution pattern can be formed by irradiating the road surface with second light. Therefore, the drawing pattern can be drawn on the road surface by the first light distribution pattern and the second light distribution pattern. The road surface drawing unit can have a right-side road surface drawing unit disposed on the right side and configured to irradiate the first light and a left-side road surface drawing unit disposed on the left side and configured to irradiate the second light. The first light irradiated by the right-side road surface drawing unit and the second light irradiated by the left-side road surface drawing unit are set in a complementary color relationship. Therefore, in the pattern drawn on the road surface, the portion drawn by the first light distribution pattern is made conspicuous by the portion drawn by the second light distribution pattern, while the portion drawn by the second light distribution pattern is made conspicuous by the portion drawn by the first light distribution pattern. Therefore, the visibility of the entire drawing pattern can be improved.

Consider the addition of a certain function to a vehicle body, either as an internal unit of the lamp body or as a separate unit. In this case, after the certain function is installed into the vehicle body, a drawing pattern may be drawn on a road surface at a position deviated from a designed target position due to an attachment error of this unit to the vehicle body or the like in some cases. Due to the deviated drawing position from the designed target position, distortion or blurring of the drawing pattern may occur. However, the deviation of the drawing position cannot be corrected at present.

In the conventional technique, when drawing is performed at a position deviated from a designed target position on a road surface, it is sometimes difficult to correct the deviation of the drawing position.

SUMMARY

The presently disclosed subject matter was devised in view of these and other problems and features in association with the conventional art. According to an aspect of the presently disclosed subject matter, there can be provided an illumination device capable of correcting a deviation of a drawing position when drawing is performed at a position deviated from a designed target position on a road surface.

According to another aspect of the presently disclosed subject matter, an illumination device can include: a first irradiation unit configured to irradiate light having a first light distribution pattern; and a second irradiation unit configured to irradiate light having a second light distribution pattern different from the first light distribution pattern, wherein at least one of the first light distribution pattern and the second light distribution pattern includes a main pattern and an auxiliary pattern configured to have an assisting function. Specifically, the "auxiliary pattern" used herein may mean a light distribution pattern that has a specific shape different from that of the main pattern and serves to function as a reference or a guiding point for use in adjusting a projection direction of a lamp unit (irradiation unit) configured to project another main pattern or the like.

In the illumination device according to the aforementioned aspect, the auxiliary pattern may be used for aligning the first light distribution pattern and the second light distribution pattern, and the first light distribution pattern and the second light distribution pattern may be combined to form a pattern different from the first light distribution pattern and the second light distribution pattern.

The illumination device according to the aforementioned aspect may be configured to include a changing unit configured to change one or both of an irradiation position of the first light distribution pattern and an irradiation position of the second light distribution pattern.

The illumination device according to the aforementioned aspect may be configured to include a detecting unit configured to detect at least one of the first light distribution pattern drawn on a screen and the second light distribution pattern drawn on a screen, and an adjustment unit configured to adjust at least one of the first light distribution pattern and the second light distribution pattern detected by the detecting unit.

The illumination device according to the aforementioned aspect may be configured to include a third irradiating unit configured to irradiate light having a third light distribution pattern, wherein the adjustment unit may adjust at least one of the first light distribution pattern and the second light distribution pattern on the basis of the third light distribution pattern.

According to the presently disclosed subject matter, there can be provided an illumination device capable of correcting a deviation of a drawing position when drawing is performed at a position deviated from a designed target position on a road surface.

According to another aspect of the presently disclosed subject matter, a pattern-drawing apparatus configured to draw a pattern and installed in a vehicle body, can include: a plurality of drawing units configured to irradiate light of a drawing image having a predetermined pattern on any of a road surface in the vicinity of the vehicle body and a virtual screen assumed to be disposed in the vicinity of the vehicle body; an irradiation-direction adjustment unit configured to shift a position of at least one of the irradiated drawing images by the drawing units. In this configuration the plurality of drawing units can include: a first drawing unit configured to irradiate light having a first drawing pattern which is a part of the predetermined pattern and a first auxiliary pattern which is smaller than the predetermined pattern, and a second drawing unit configured to irradiate light having a second drawing pattern which is different from the first drawing pattern and is another part of the predetermined pattern and a second auxiliary pattern which is smaller than the predetermined pattern. The irradiation-direction adjustment unit is capable of moving at least one of the positions of the irradiated drawing images of the first drawing unit and the second drawing unit so that the first auxiliary pattern and the second auxiliary pattern are shifted to coincide with each other or be located with a predetermined positional relationship to combine the first drawing pattern and the second drawing pattern into the predetermined pattern.

In the pattern-drawing apparatus with the aforementioned configuration, the first auxiliary pattern irradiated by the first drawing unit and the second auxiliary pattern irradiated by the second drawing unit can each be formed in a shape selected from the group consisting of a circle, an oval, a polygon, a shape derived from a circle or a polygon a part of which is eliminated, a shape constituted by at least one line segment, and combinations of any two or more of these shapes, and the irradiation-direction adjustment unit can move at least one of the positions of the irradiated drawing images of the first drawing unit and the second drawing unit, so that when the first auxiliary pattern and the second auxiliary pattern are shifted to coincide with each other, the first drawing pattern and the second drawing pattern are combined to form the predetermined pattern.

In the pattern-drawing apparatus with the aforementioned configuration, the predetermined pattern formed by combining the first drawing pattern and the second drawing pattern may be a combination of a width pattern corresponding to a width of the vehicle body and a length pattern having a length longer than the width pattern and showing a length direction of the vehicle body, and the first drawing unit and the second drawing unit may irradiate the first drawing pattern and the second drawing pattern, respectively, on the road surface in front of the vehicle body or in the rear of the vehicle body.

In the pattern-drawing apparatus with the aforementioned configuration, the first drawing unit may be disposed at a front portion of the vehicle body on one of a right side and a left side, and the second drawing unit may be disposed at the front portion of the vehicle body on the other of the right side and the left side. In this case, the first drawing pattern may be a width pattern showing a width direction of the vehicle body, and the second drawing pattern may be a length pattern showing a length direction of the vehicle body.

The pattern-drawing apparatus with the aforementioned configuration may further include a vehicle outside detection unit configured to recognize an area where the first drawing unit and the second drawing unit irradiate light with the first drawing pattern and light with the second drawing pattern and detect the first auxiliary pattern and the second auxiliary pattern to generate and output a signal of information of the first auxiliary pattern and a signal of information of the second auxiliary pattern to the irradiation-direction adjustment unit. In this case, the irradiation-direction adjustment unit may acquire the signals outputted by the vehicle outside detection unit to move at least one of the positions of the irradiated drawing images of the first drawing unit and the second drawing unit so that the first drawing unit and/or the second drawing unit project respective light to a desired position.

In the pattern-drawing apparatus with the aforementioned configuration, the signal of information outputted by the vehicle outside detection unit may include position information of the first auxiliary pattern and the second auxiliary pattern.

According to still another aspect of the presently disclosed subject matter, a vehicle periphery illumination device can include: the pattern-drawing apparatus with the aforementioned configuration; and a light distribution illumination device configured to be installed in a vehicle body and irradiate light having a predetermined light distribution around the vehicle body, wherein the pattern-drawing apparatus can be installed in a vicinity or inside of the light distribution illumination device.

According to still further another aspect of the presently disclosed subject matter, an illumination device can be configured to draw a pattern and installed in a vehicle body, and can include: a left headlight unit configured to be disposed at a front portion of the vehicle body on a left side and include a first drawing unit configured to irradiate light having a first drawing image having at least a part of a predetermined pattern on a road surface or a screen assumed to be disposed in a vicinity of the vehicle body; a right headlight unit configured to be disposed at a front portion of the vehicle body on a right side and include a second drawing unit configured to irradiate light having a second drawing image having at least another part of the predetermined pattern on the road surface or the screen; and an irradiation-direction adjustment unit configured to shift a position of at least one of the irradiated drawing images by the first and second drawing units. In this illumination device, the first drawing unit can be configured to irradiate light having a first drawing pattern which is the part of the predetermined pattern and a first auxiliary pattern which is smaller than the predetermined pattern, and the second drawing unit can be configured to irradiate light having a second drawing pattern which is different from the first drawing pattern and is the another part of the predetermined pattern and a second auxiliary pattern which is smaller than the other predetermined pattern. The irradiation-direction adjustment unit is capable of moving at least one of the positions of the irradiated drawing images of the first drawing unit and the second drawing unit so that the first auxiliary pattern and the second auxiliary pattern are shifted to coincide with each other or be located with a predetermined positional relationship to combine the first drawing pattern and the second drawing pattern into the predetermined pattern.

With the use of these apparatus and devices, a predetermined pattern can be drawn on a road surface or the like screen in front of or in the rear of a vehicle body to allow a driver to recognize a proper positioning of the illumination unit/device or form proper shaped pattern showing a specific meaning.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Figure 1:
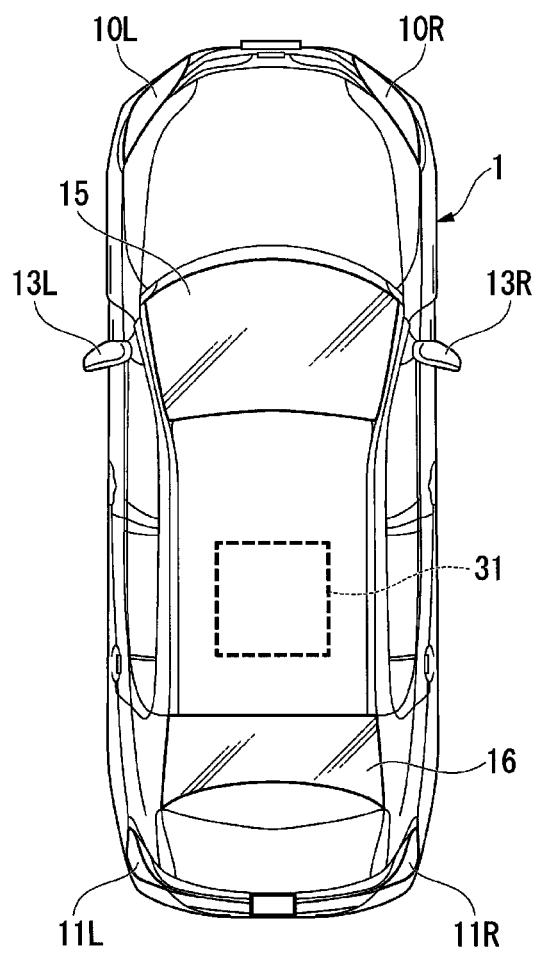
FIG. 1 is a diagram showing a schematic configuration of an automobile 1 made in accordance with principles of the presently disclosed subject matter.

A description will now be made below to illumination devices and systems of the presently disclosed subject matter with reference to the accompanying drawings in accordance with exemplary embodiments. The following exemplary embodiments are illustrated by way of examples, and exemplary embodiments to which the presently disclosed subject matter is applied are not limited thereto.

In all the drawings for describing the exemplary embodiments, the same reference numerals are assigned to those having the same functions, and a redundant description thereof will be omitted.

The phrases "based on AA" and "on the basis of AA" as used herein mean "based at least on AA" and "on the basis of at least AA," and may also include the case based on another element in addition to AA. Furthermore, the phrases "based on AA" and "on the basis of AA" are not limited to the case where AA is directly used, and may also include the case based on the matter which is obtained by calculation or processing on AA. "AA" is any appropriate element (for example, any information).

[First Exemplary Embodiment]

An illumination device according to the presently disclosed subject matter can be mounted on a vehicle. In the present exemplary embodiment, examples of the vehicles may include, in addition to an automobile as illustrated, a motorcycle, a bicycle, an ultra-small mobility, and a personal mobility.

[Schematic Configuration of Automobile]

FIG. 1 is a diagram showing a schematic configuration of an automobile 1 having an illumination device according to an exemplary embodiment of the presently disclosed subject matter.

The automobile 1 can be configured to include a headlamp disposed on the left side of a vehicle body of the automobile 1 (referred to as a left headlamp portion 10L in this exemplary embodiment), a headlamp disposed on the right side thereof (referred to as a right headlamp portion 10R in this exemplary embodiment), a tail lamp disposed on the left side thereof (referred to as a left tail lamp portion 11L in this exemplary embodiment), a tail lamp disposed on the right side thereof (referred to as a right tail lamp portion 11R in this exemplary embodiment), a sideview mirror disposed on the left side thereof (referred to as a left sideview mirror 13L in this exemplary embodiment), a sideview mirror disposed on the right side thereof (referred to as a right sideview mirror 13R in this exemplary embodiment), a front window 15, and a rear window 16.

Specifically, the left headlamp portion 10L is disposed on the left side of the front of the automobile 1, and the right headlamp portion 10R is disposed on the right side of the front of the automobile 1. The left tail lamp portion 11L is disposed on the left side of the rear of the automobile 1, and the right tail lamp portion 11R is disposed on the right side of the rear of the automobile 1. The automobile 1 can also include a control unit 31.

Here, in the present exemplary embodiment, a part of the constituent parts of the automobile 1 is shown, but in addition thereto, for example, optional constituent parts such as constituent parts normally provided in a general automobile may be provided. The control unit 31 may be provided inside the automobile 1 without being observed in the appearance of the automobile 1.

Figure 2:
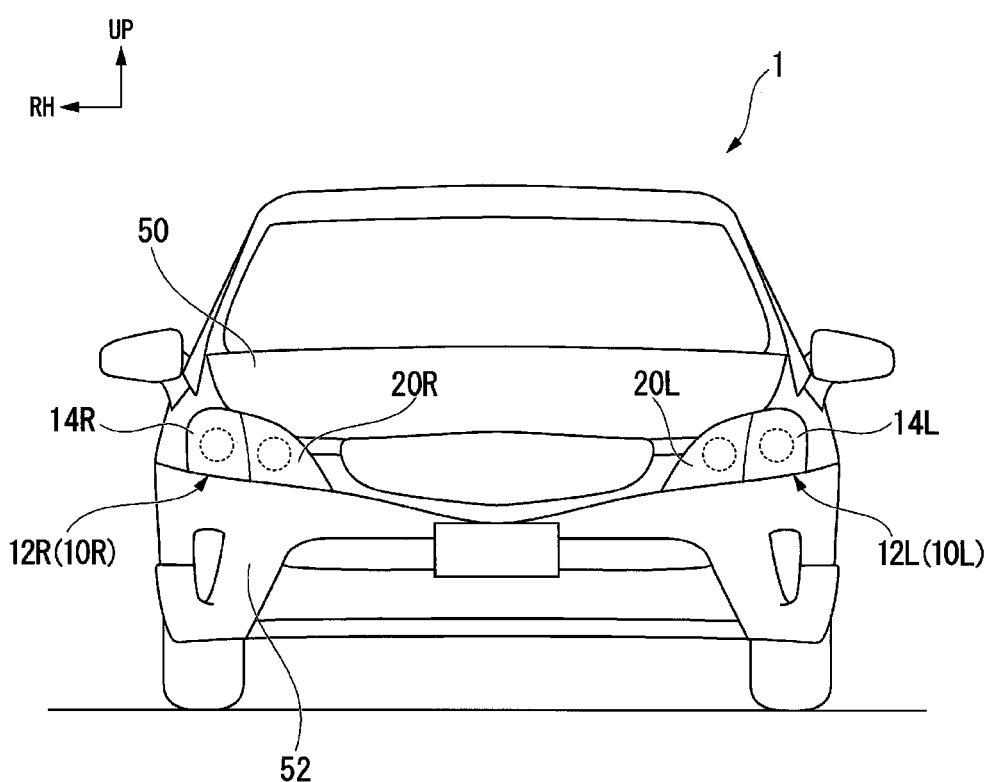
FIG. 2 is a view showing a front portion of the automobile 1 to which an illumination device according to an exemplary embodiment of the presently disclosed subject matter is applied.

FIG. 2 is a diagram showing a front portion of the automobile 1 to which an illumination device according to the exemplary embodiment of the presently disclosed subject matter is applied. As shown in FIG. 2, the left headlamp portion 10L includes a headlamp unit 12L on the left side having a left road surface drawing portion 20L. The headlamp unit 12L is disposed at the left end portion of the front-end portion of the automobile 1, and the left road surface drawing portion 20L is disposed on the right side of the headlamp unit 12L. The right headlamp portion 10R includes a headlamp unit 12R on the right side having a right road surface drawing portion 20R. The headlamp unit 12R is disposed at the right end portion of the front-end portion of the automobile 1, and the right road surface drawing portion 20R is disposed on the left side of the headlamp unit 12R.

A front-end portion of a hood 50 configured to open and close the engine room of the automobile 1 is situated above the headlamp units 12R and 12L. The lower portions of the left road surface drawing portion 20L and the right road surface drawing portion 20R are covered from the front side by a bumper cover 52 constituting the front-end portion of the automobile 1. The headlamp unit 12R and the headlamp unit 12L are configured to be bilaterally symmetrical in the vehicle width direction.

The headlamp unit 12L can be configured to include a left headlamp 14L constituting an outer portion in the vehicle width direction of the headlamp unit 12L, and the left road surface drawing portion 20L constituting an inner portion in the vehicle width direction of the headlamp unit 12L.

The headlamp unit 12R can be configured to include a right headlamp 14R constituting an outer portion in the vehicle width direction of the headlamp unit 12R, and the left road surface drawing portion 20R constituting an inner portion in the vehicle width direction of the headlamp unit 12R.

The left headlamp 14L and the right headlamp 14R each have a not-illustrated light source, and can illuminate the front of the automobile 1 with light from the light source. The light source is configured as a light source for a low beam and a light source for a high beam. That is, the left headlamp 14L and the right headlamp 14R are configured to be switchable between a function of emitting a low beam which mainly irradiates a road surface region (low beam light distribution area) in front of the automobile 1 and a function of emitting a high beam which irradiates a region (high beam light distribution area) farther than (above in front view) the region irradiated by the low beam. As the light sources of the left headlamp 14L and the right headlamp 14R, an LED (Light Emitting Diode), a halogen lamp, a discharge lamp, a laser, or the like may be used.

Figure 3:
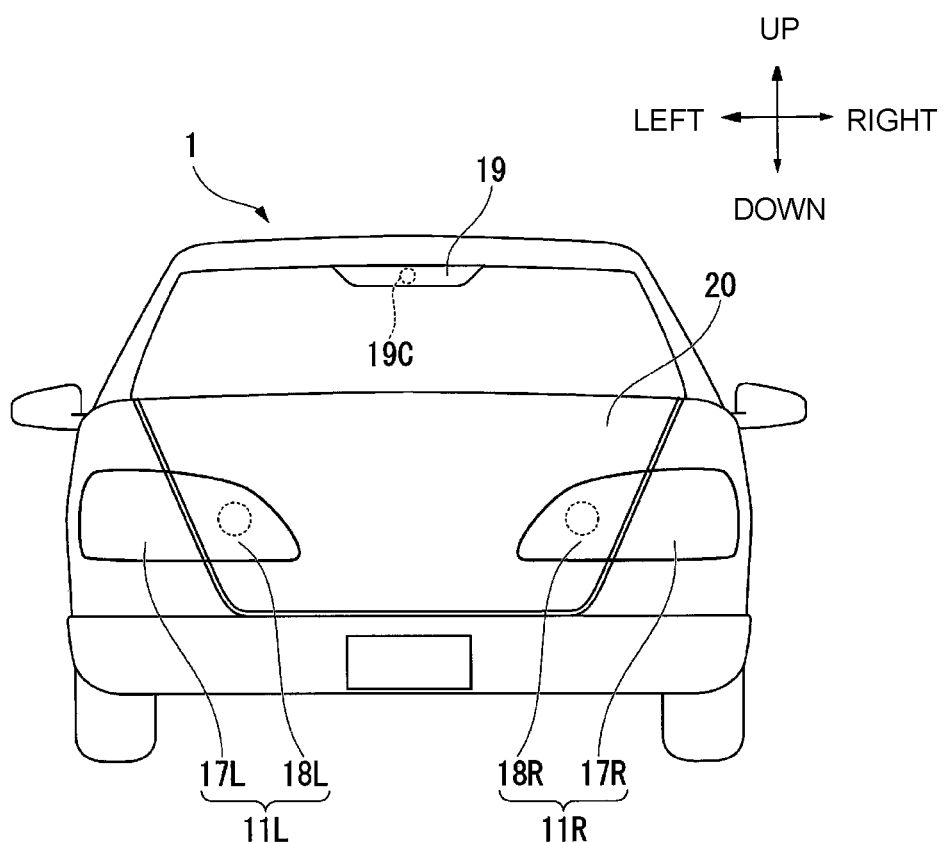
FIG. 3 is a view showing a rear portion of the automobile 1 to which an illumination device according to an exemplary embodiment of the presently disclosed subject matter is applied.

FIG. 3 is a view showing a rear portion of the automobile 1 to which the illumination device according to an exemplary embodiment of the presently disclosed subject matter is applied. As shown in FIG. 3, the automobile 1 can be configured to include a tail lamp disposed on the left side (referred to as the left tail lamp portion 11L in this exemplary embodiment), a tail lamp disposed on the right side (referred to as the right tail lamp portion 11R in this exemplary embodiment), and a high mount stop lamp 19.

The left tail lamp portion 11L is disposed on the left side of the rear portion of the automobile 1, and can emit light mainly toward the rear of the automobile 1. The right tail lamp portion 11R is disposed on the right side of the rear portion of the automobile 1, and can emit light mainly toward the rear of the automobile 1.

The left tail lamp portion 11L can be configured to include a left tail lamp 17L and a left-rear side road surface drawing portion 18L provided in the automobile 1.

The right tail lamp portion 11R can be configured to include a right tail lamp 17R and a right-rear side road surface drawing portion 18R provided in the automobile 1.

The high mount stop lamp 19 can be configured to include a center-rear road surface drawing portion 19C.

[Functional Configuration of Control System of Automobile]

Figure 4:
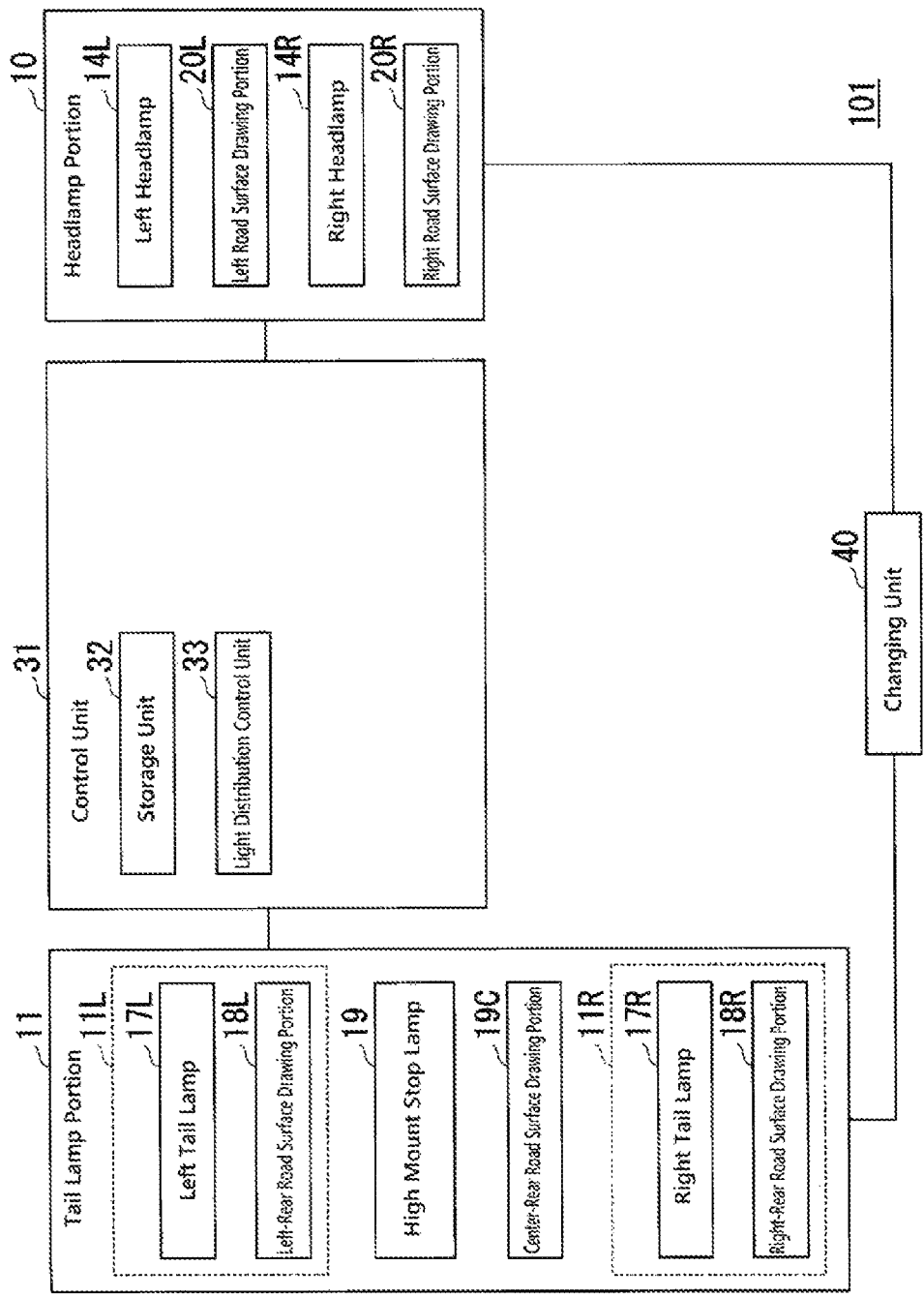
FIG. 4 is a functional block diagram showing a schematic functional configuration of an illumination system 101 provided in the automobile 1 according to the exemplary embodiment of the presently disclosed subject matter.

FIG. 4 is a functional block diagram showing a schematic functional configuration of an illumination system 101 provided in the automobile 1 according to the exemplary embodiment of the presently disclosed subject matter.

The lighting system 101 can be configured to include a headlamp portion 10, a tail lamp portion 11, the control unit 31, and a changing unit 40.

Here, in the present exemplary embodiment, similarly to the general concept of "front and rear," the direction in which the driver of the automobile 1 faces in the normal state and in which the automobile 1 travels in the normal state is referred to as "front (forward)," and the opposite direction is referred to as "rear (rearward)."

The headlamp portion 10 can be a so-called headlamp, and configured to irradiate light to the front of the automobile 1.

The left road surface drawing portion 20L can be configured to mainly irradiate the left side in front of the automobile 1 with light. The left road surface drawing portion 20L can be configured to irradiate light having a predetermined light distribution pattern, which is referred to as a first left-front (LF) light distribution pattern in the present exemplary embodiment. The left road surface drawing portion 20L can be configured to draw an image on the road surface by irradiating light having the first LF light distribution pattern. Herein, the first LF light distribution pattern itself may change with time. The first LF light distribution pattern may include a predetermined point, which is referred to as a first left-front drawing position adjusting point or a first LF point in the present exemplary embodiment, used when adjusting the drawing position of the first LF light distribution pattern of light irradiated by the left road surface drawing portion 20L. Herein, the first left-front drawing position adjusting point can serve as an auxiliary pattern configured to have an assisting function for aligning the pattern positions, and the term "point" used in the same manner refers to the same.

The first LF point may be drawn with such a dimension that an angle (visual angle) formed between a line connecting one end of the drawing area of the first LF point and the eye of a user who is looking forward in the vicinity of the automobile 1 and a line connecting the eye and the other end of the drawing area may preferably be one degree or larger, where the ends of the drawing area refers to ends of a longer distance (vertical distance or horizontal distance) of the drawing area of the first LF point formed on a road surface.

The right road surface drawing portion 20R can be configured to mainly irradiate the right side in front of the automobile 1 with light. The right road surface drawing portion 20R can be configured to irradiate light having a predetermined light distribution pattern, which is referred to as a first right-front (RF) light distribution pattern in the present exemplary embodiment. The right road surface drawing portion 20R can be configured to draw an image on the road surface by irradiating light having the first RF light distribution pattern. Herein, the first RF light distribution pattern itself may change with time. The first RF light distribution pattern may include a predetermined point, which is referred to as first right-front drawing position adjusting point or a first RF point in the present exemplary embodiment, used when adjusting the drawing position of the first RF light distribution pattern of light irradiated by the right road surface drawing portion 20R.

The first RF point may be drawn with such a dimension that an angle (visual angle) formed between a line connecting one end of the drawing area of the first RF point and the eye of a user who is looking forward in the vicinity of the automobile 1 and a line connecting the eye and the other end of the drawing area may preferably be one degree or larger, where the ends of the drawing area refers to ends of a longer distance (vertical distance or horizontal distance) of the drawing area of the first RF point formed on a road surface.

The left headlamp 14L can be configured to mainly irradiate the left side in front of the automobile 1 with light. The left headlamp 14L can have a function of irradiating light of a traveling beam (so-called high beam) and a function of irradiating light of a passing beam (so-called low beam), and these two functions can be switched. The left headlamp 14L can be configured to irradiate light having a predetermined light distribution pattern, which is referred to as a second left-front (LF) light distribution pattern in the present exemplary embodiment, when the left headlamp 14L irradiates a road surface with low-beam light. Herein, the second LF light distribution pattern itself may change with time. The second LF light distribution pattern may include a predetermined point, which is referred to as a second left-front drawing position adjusting point or a second LF point in the present exemplary embodiment, used when adjusting the drawing position of the first LF light distribution pattern of light irradiated by the left road surface drawing portion 20L.

The second LF point may be drawn with such a dimension that an angle (visual angle) formed between a line connecting one end of the drawing area of the second LF point and the eye of a user who is looking forward in the vicinity of the automobile 1 and a line connecting the eye and the other end of the drawing area may preferably be one degree or larger, where the ends of the drawing area refers to ends of a longer distance (vertical distance or horizontal distance) of the drawing area of the second LF point formed on a road surface.

The right headlamp 14R can be configured to mainly irradiate the right side of the front of the automobile 1 with light. The right headlamp 14R can have a function of irradiating light of a traveling beam (so-called high beam) and a function of irradiating light of a passing beam (so-called low beam), and these two functions can be switched. The right headlamp 14R can be configured to irradiate light having a predetermined light distribution pattern, which is referred to as a second right-front (RF) light distribution pattern in this exemplary embodiment, when the right headlamp 14R irradiates a road surface with low-beam light. Herein, the second RF light distribution pattern itself may change with time. The second RF light distribution pattern may include a predetermined point, which is referred to as a second right-front drawing position adjusting point or a second RF point in the present exemplary embodiment, used when adjusting the drawing position of the first RF light distribution pattern of light irradiated by the right road surface drawing portion 20R.

The second RF point may be drawn with such a dimension that an angle (visual angle) formed between a line connecting one end of the drawing area of the second RF point and the eye of a user who is looking forward in the vicinity of the automobile 1 and a line connecting the eye and the other end of the drawing area may preferably be one degree or larger, where the ends of the drawing area refers to ends of a longer distance (vertical distance or horizontal distance) of the drawing area of the second RF point formed on a road surface.

Each of the left headlamp 14L, the right headlamp 14R, the left road surface drawing portion 20L, and the right road surface drawing portion 20R may adopt any suitable lamp/light source Specific examples of the suitable lamp/light source may include a lamp for a traveling beam, a lamp for a passing beam, a MEMS (Micro Electro Mechanical Systems) laser scanning headlamp, a DMD (Digital Mirror Device) headlamp, a matrix ADB headlamp capable of controlling columns and rows, and an ADB headlamp capable of controlling only columns, which may be used alone or two or more of which may be used in combination.

Here, the MEMS laser scanning headlamp is an example of a vehicular headlamp capable of variably changing the light distribution, and is an example of a seamless ADB lamp.

The tail lamp portion 11 can be a so-called rear lamp, and configured to irradiate light to the rear of the automobile 1.

The left tail lamp 17L can be configured to mainly irradiate the left side in rear of the automobile 1.

The left-rear road surface drawing portion 18L can be configured to irradiate light having a predetermined light distribution pattern, which is referred to as a left-rear (LR) light distribution pattern in the present exemplary embodiment. Herein, the LR light distribution pattern itself may change with time. The left-rear road surface drawing portion 18L can be configured to draw an image on the road surface by irradiating light having the LR light distribution pattern. The LR light distribution pattern may include a predetermined point, which is referred to as a first left-rear drawing position adjusting point or a first LR point in the present exemplary embodiment, used when adjusting the irradiation position of the LR light distribution pattern irradiated by the left-rear road surface drawing portion 18L. The first LR point may be drawn with such a dimension that an angle (visual angle) formed between a line connecting one end of the drawing area of the first LR point and the eye of a user who is looking forward in the vicinity of the automobile 1 and a line connecting the eye and the other end of the drawing area may preferably be one degree or larger, where the ends of the drawing area refers to ends of a longer distance (vertical distance or horizontal distance) of the drawing area of the first LR point formed on a road surface.

The right tail lamp portion 11R can be configured to mainly irradiate the right side in rear of the automobile 1 with light.

The right-rear road surface drawing portion 18R can be configured to irradiate light having a predetermined light distribution pattern, which is referred to as a right-rear (RR) light distribution pattern in the present exemplary embodiment. Herein, the RR light distribution pattern itself may change with time. The right-rear road surface drawing portion 18R can be configured to draw an image on the road surface by irradiating light having the RR light distribution pattern. The RR light distribution pattern may include a predetermined point, which is referred to as a first right-rear drawing position adjusting point or a first RR point in the present exemplary embodiment, used when adjusting the irradiation position of the RR light distribution pattern irradiated by the right-rear road surface drawing portion 18R. The first RR point may be drawn with such a dimension that an angle (visual angle) formed between a line connecting one end of the drawing area of the first RR point and the eye of a user who is looking forward in the vicinity of the automobile 1 and a line connecting the eye and the other end of the drawing area may preferably be one degree or larger, where the ends of the drawing area refers to ends of a longer distance (vertical distance or horizontal distance) of the drawing area of the first RR point formed on a road surface.

The high mount stop lamp 19 can be configured to mainly irradiate the center in rear of the automobile 1 with light.

The center-rear road surface drawing portion 19C can be configured to irradiate light having a predetermined light distribution pattern, which is referred to as a center-rear (CR) light distribution pattern in the present exemplary embodiment. The CR light distribution pattern may include a predetermined point, which is referred to as a second left-rear drawing position adjusting point or a second LR point in the present exemplary embodiment, used when adjusting the drawing position of the LR light distribution pattern irradiated by the left-rear road surface drawing portion 18L and a predetermined point, which is referred to as a second right-rear drawing position adjusting point or a second RR point in the present exemplary embodiment) used when adjusting the drawing position of the RR light distribution pattern irradiated by the right-rear road surface drawing portion 18R. The second LR point and the second RR point may be drawn with such a dimension that an angle (visual angle) formed between a line connecting one end of the drawing area of each of the second LR point and the second RR point and the eye of a user who is looking forward in the vicinity of the automobile 1 and a line connecting the eye and the other end of the drawing area may preferably be one degree or larger, where the ends of the drawing area refers to ends of a longer distance (vertical distance or horizontal distance) of the drawing area of each of the second LR point and the second RR point formed on a road surface.

The control unit 31 can be configured to include a storage unit 32 and a light distribution control unit 33.

The storage unit 32 can store information. Herein, the storage unit 32 may store any information. As an example, the storage unit 32 may store information such as control programs to be executed by the control unit 31 and control parameters to be used in the control unit 31. In this instance, the control unit 31 may include a processor such as a CPU (Central Processing Unit), and perform various processes by executing various control programs stored in the storage unit 32 using control parameters stored in the storage unit 32.

The light distribution control unit 33 can control the light distribution formed by the headlamp portion 10 (including the left headlamp 14L, the right headlamp 14R, the left road surface drawing portion 20L, and the right road surface drawing portion 20R) by controlling the light irradiation by the headlamp portion 10 (the left headlamp 14L, the right headlamp 14R, the left road surface drawing portion 20L, and the right road surface drawing portion 20R).

Herein, for example, the light distribution control unit 33 can control the light distribution when the headlamp portion 10 (the left headlamp 14L, the right headlamp 14R, the left road surface drawing portion 20L, and the right road surface drawing portion 20R) is turned on, or the light distribution when the headlamp portion 10 (the left headlamp 14L, the right headlamp 14R, the left road surface drawing portion 20L, and the right road surface drawing portion 20R) is flashing.

Specifically, the light distribution control unit 33 can control the light distribution formed by the left road surface drawing portion 20L that can irradiate light having the first LF light distribution pattern. The light distribution control unit 33 can also control the light distribution formed by the right road surface drawing portion 20R that can irradiate light having the first RF light distribution pattern. The light distribution control unit 33 can also control the light distribution of the low beam formed by the left headlamp 14L that can irradiate light having the second LF light distribution pattern. In addition, the light distribution control unit 33 can control the light distribution of the low beam formed by the right headlamp 14R that can irradiate light having the second RF light distribution pattern.

The light distribution control unit 33 can control the light distribution formed by the tail lamp portion 11 (the left tail lamp 17L, the left-rear road surface drawing portion 18L, the high mount stop lamp 19, the center-rear road surface drawing portion 19C, the right tail lamp 17R, and the right-rear road surface drawing portion 18R) by controlling the light irradiation by the tail lamp portion 11 (the left tail lamp 17L, the left-rear road surface drawing portion 18L, the high mount stop lamp 19, the center-rear road surface drawing portion 19C, the right tail lamp 17R, and the right-rear road surface drawing portion 18R).

Herein, for example, the light distribution control unit 33 can controls the light distribution when the tail lamp portion 11 (the left tail lamp 17L, the left-rear road surface drawing portion 18L, the high mount stop lamp 19, the center-rear road surface drawing portion 19C, the right tail lamp 17R, and the right-rear road surface drawing portion 18R) is turned on, or the light distribution when the tail lamp portion 11 (the left tail lamp 17L, the left-rear road surface drawing portion 18L, the high mount stop lamp 19, the center-rear road surface drawing portion 19C, the right tail lamp 17R, and the right-rear road surface drawing portion 18R) is flashing.

Specifically, the light distribution control unit 33 can control the light distribution formed by the left-rear road surface drawing portion 18L that can irradiate light having the LR light distribution pattern. The light distribution control unit 33 can also control the light distribution formed by the center-rear road surface drawing portion 19C that can irradiate light having the CR light distribution pattern. In addition, the light distribution control unit 33 can control the light distribution of the light formed by the right-rear road surface drawing portion 18R that can irradiate light having the RR light distribution pattern.

The changing unit 40 can change the irradiation position of pattern formed by the left road surface drawing portion 20L that can irradiate light having the first LF light distribution pattern. Specifically, a user causes the left headlamp 14L to irradiate light having the second LF light distribution pattern, and causes the left road surface drawing portion 20L to irradiate light having the first LF light distribution pattern. In this state, the user can adjust the changing unit to adjust the position of the first LF point included in the first LF light distribution pattern of light irradiated by the left road surface drawing portion 20L on the basis of the second LF point included in the second LF light distribution pattern of light irradiated by the left headlamp 14R.

The changing unit 40 can change the irradiation position of pattern formed by the right road surface drawing portion 20R that can irradiate light having the first RF light distribution pattern. Specifically, a user causes the right headlamp 14R to irradiate light having the second RF light distribution pattern, and causes the right road surface drawing portion 20R to irradiate light having the first RF light distribution pattern. In this state, the user can adjust the changing unit 40 to adjust the position of the first RF point included in the first RF light distribution pattern of light irradiated by the right road surface drawing portion 20R on the basis of the second RF point included in the second RF light distribution pattern of light irradiated by the right headlamp 14R.

The changing unit 40 can change the irradiation position of pattern formed by the left-rear road surface drawing portion 18L that can irradiate light having the LR light distribution pattern. Specifically, a user causes the left-rear road surface drawing portion 18L to irradiate light having the LR light distribution pattern, and causes the center-rear road surface drawing portion 19C to irradiate light having the CR light distribution pattern. In this state, the user can adjust the changing unit 40 to adjust the position of the first LR point included in the LR light distribution pattern of light irradiated by the left-rear road surface drawing portion 18L on the basis of the second LR point included in the CR light distribution pattern of light irradiated by the center-rear road surface drawing portion 19C.

The changing unit 40 can change the irradiation position of pattern formed by the right-rear road surface drawing portion 18R that can irradiate light having the RR light distribution pattern. Specifically, a user causes the right-rear road surface drawing portion 18R to irradiate light having the RR light distribution pattern, and causes the center-rear road surface drawing portion 19C to irradiate light having the CR light distribution pattern. In this state, the user can adjust the changing unit 40 to adjust the position of the first RR point included in the LR light distribution pattern of light irradiated by the right-rear road surface drawing portion 18R on the basis of the second RR point included in the CR light distribution pattern of light irradiated by the center-rear road surface drawing portion 19C.

Figure 5:
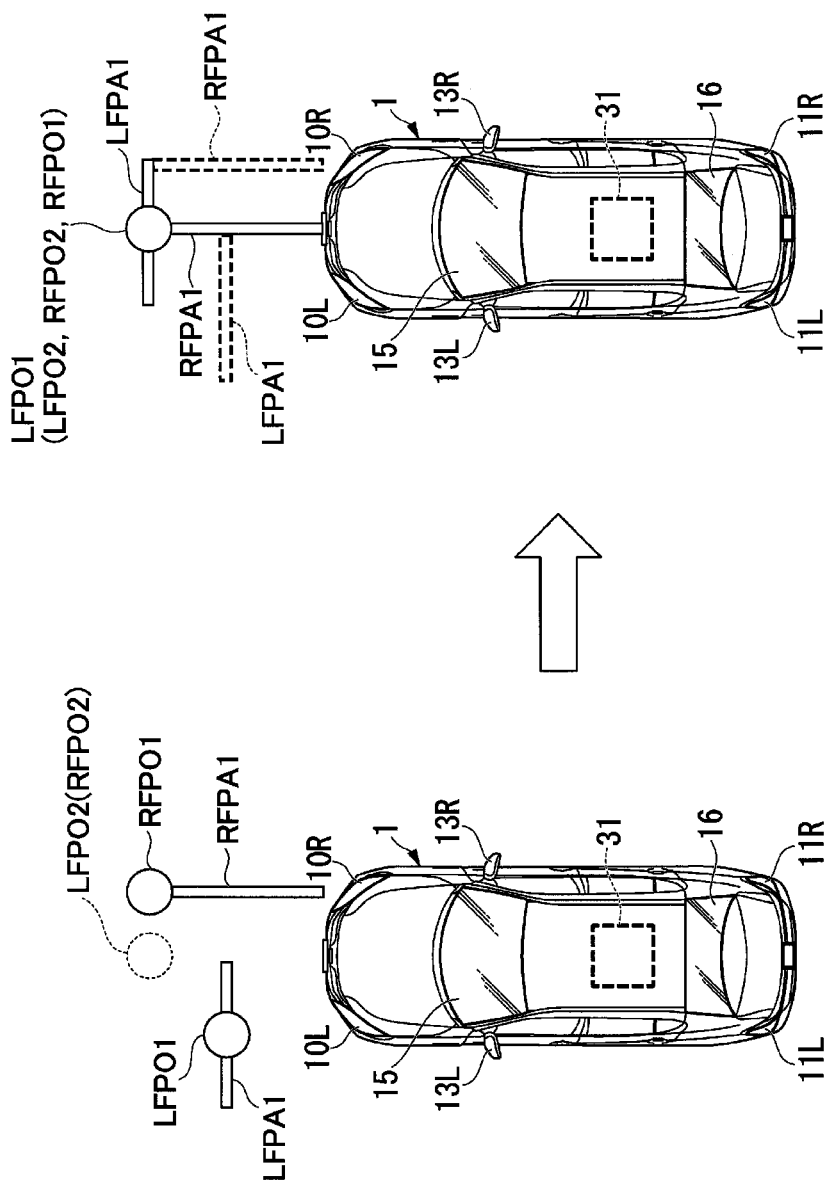
FIG. 5 is a diagram showing an example of adjustment of a drawing position.

FIG. 5 is a diagram showing an example of adjustment of the drawing positions. The left-hand drawing in FIG. 5 shows the state before the adjustment of the drawing position while the right-hand drawing shows the state after the adjustment of the drawing position. FIG. 5 shows, as an example, a case where the second LF point included in the second LF light distribution pattern of light irradiated by the left headlamp 14L included in the left headlamp portion 10L coincides with the second RF point included in the second RF light distribution pattern of light irradiated by the right headlamp 14R included in the right headlamp portion 10R.

As shown in the left-hand drawing in FIG. 5, the left headlamp 14L of the left headlamp portion 10L can irradiate light having the second LF light distribution pattern as a low beam. The second LF light distribution pattern includes the second LF point LFPO2. The right headlamp 14R of the right headlamp portion 10R can irradiate light having the second RF light distribution pattern as a low beam. The second RF light distribution pattern includes the second RF point RFPO2. As shown in the left-hand diagram of FIG. 5, the second LF point LFP2 and the second RF-point RFP2 coincide with each other.

Further, the left road surface drawing portion 20L of the left headlamp portion 10L can irradiate light having the first LF light distribution pattern LFPA1. The first LF light distribution pattern LFPA1 includes the first LF point LFPO1. The right road surface drawing portion 20R of the right headlamp portion 10R can irradiate light having the first RF light distribution pattern RFPA1. The first RF light distribution patterns RFPA1 includes the first RF point RFPO1.

In the state of the left-hand drawing in FIG. 5, the user adjusts the changing unit 40 to cause the first LF point LFPO1 included in the first LF light distribution pattern LFPA1 of light irradiated by the left road surface drawing portion 20L and the first RF point RFPO1 included in the first RF light distribution pattern RFPA1 of light irradiated by the right road surface drawing portion 20R to coincide with the second LF point LFPO2 included in the second LF light distribution pattern (also the second RF point RFPO2 included in the second RF light distribution pattern).

As a result, as shown in the right-hand drawing in FIG. 5, the drawing position of the first LF light distribution pattern LFPA1 of light irradiated by the left road surface drawing portion 20L can be changed from the position shown by the broken line to the position shown by the solid line. Further, the drawing position of the first RF light distribution pattern RFPA1 of light irradiated by the right road surface drawing portion 20R can be changed from the position indicated by the broken line to the position indicated by the solid line. In this case, the combination of the first LF light distribution pattern LFPA1 of light and the first RF light distribution pattern RFPA1 of light can draw a specific drawing pattern (predetermined pattern), for example, a letter "T" in this exemplary embodiment. When the sizes of the patterns are appropriately adjusted, for example, the size of the first LF light distribution pattern LFPA1 and the size of the first RF light distribution pattern RFPA1 relatively correspond to a vehicle width and a vehicle length, a user can easily grasp a space where the patterns are projected as to whether the space can accommodate the automobile 1 to enter. Further, the first LF light distribution pattern LFPA1 may represent the width direction and relative size of the vehicle body to the associated pattern (RFPA1), and the first RF light distribution pattern RFPA1 may represent the length direction and relative size of the vehicle body to the associated pattern (LFPA1).

As discussed above, the drawing position adjusting point (or auxiliary pattern) can be used to adjust the plurality of light distribution patterns to form them into a desired pattern. Examples of the shapes of the drawing position adjusting point herein may include various shapes such as a circle, an oval, a polygon (triangle, square, rectangle, pentagon, hexagon, etc.), a shape derived from a circle, a polygon, or other shapes a part of which is eliminated, a shape constituted by at least one line segment, and combinations of any two or more of these shapes. Hereinafter, a description of examples of the drawing position adjusting points will be given with reference to several drawings.

Figure 6:
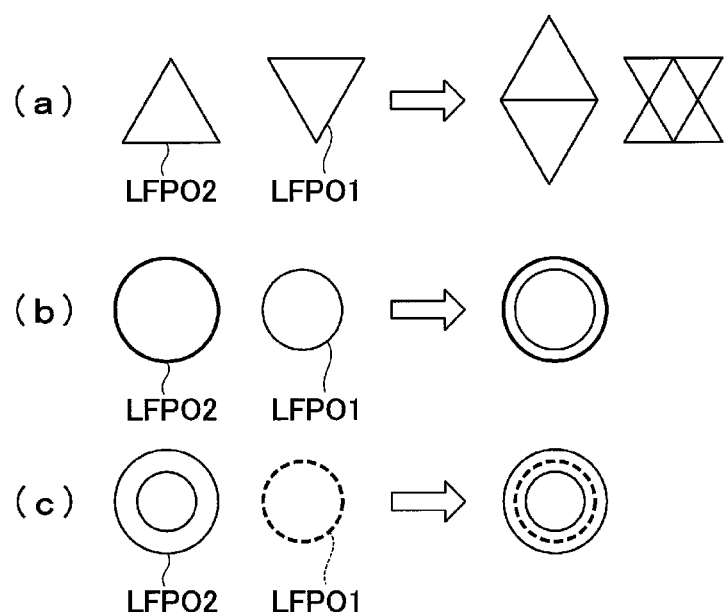
FIG. 6 is a diagram showing examples of the drawing position adjustment point (Part 1)

FIG. 6 is a diagram showing examples of the drawing position adjustment point (Part 1). Here, as examples, the second LF point LFPO2 included in the second LF light distribution pattern of light irradiated by the left headlamp 14L and the first LF point LFPO1 included in the first LF light distribution pattern LFPA1 of light irradiated by the left road surface drawing portion 20L are shown.

As shown in (a) of FIG. 6, the position of the first LF point LFPO1 can be adjusted so that the base side of the second LF point LFPO2 represented by the triangle coincides with the upper side of the first LF point LFPO1 represented by the inverted triangle, whereby the irradiation position of the first LF light distribution pattern can be adjusted to be situated in a correct position. When the position of the first LF point LFPO1 is adjusted, another drawing position adjusting point that differs from the second LF point LFPO2 and the first LF point LFPO1 can be obtained. In addition, the position of the first LF point LFPO1 can be adjusted so that the second LF point LFPO2 represented by the triangle and the first LF point LFPO1 represented by the inverted triangle overlap with each other, whereby the irradiation position of the first LF light distribution patterns is adjusted to be situated in a correct position. When the position of the first LF point LFPO1 is adjusted, another drawing position adjusting point that differs from the second LF point LFPO2 and the first LF point LFPO1 can be obtained.

As shown in (b) of FIG. 6, the position of the first LF point LFPO1 can be adjusted so that the center of the second LF point LFPO2 represented by the large circle coincides with the center of the first LF point LFPO1 represented by the small circle, whereby the irradiation position of the first LF light distribution pattern can be adjusted to be situated in a correct position. When the position of the first LF point LFPO1 is adjusted, another drawing position adjusting point that differs from the second LF point LFPO2 and the first LF point LFPO1 can be obtained.

As shown in (c) of FIG. 6, the position of the first LF point LFPO1 can be adjusted so that the first LF point LFPO1 represented by the small dashed circle is positioned between two circles of the second LF point LFPO2 represented by the double circle, whereby the irradiation position of the first LF light distribution pattern can be adjusted to be situated in a correct position. When the position of the first LF point LFPO1 is adjusted, another drawing position adjusting point that differs from the second LF point LFPO2 and the first LF point LFPO1 can be obtained.

Figure 7:
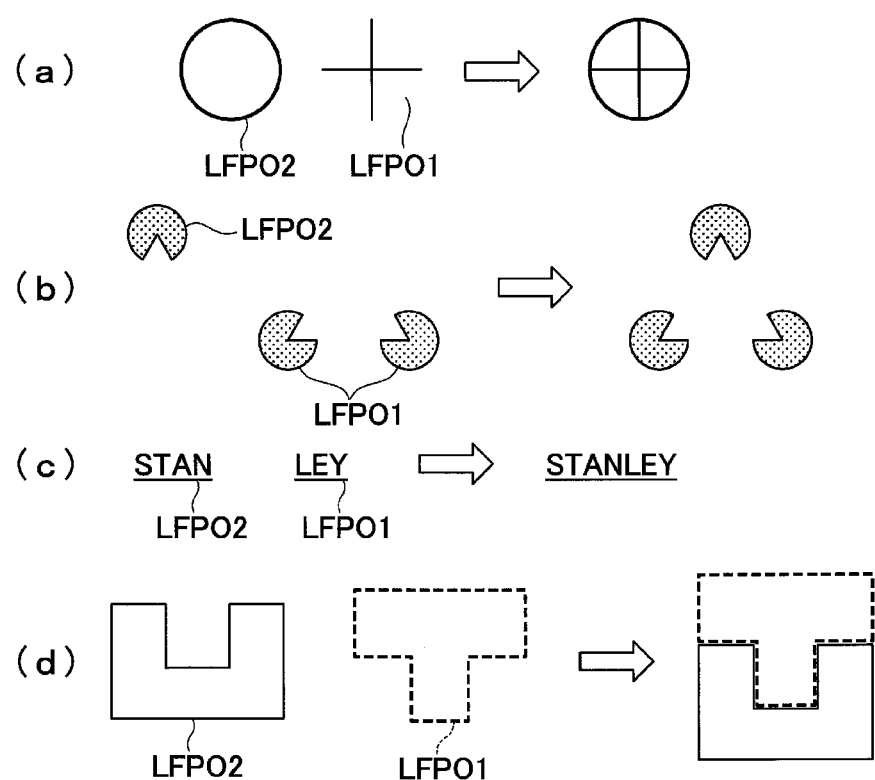
FIG. 7 is a diagram showing examples of the drawing position adjustment point (Part 2)

FIG. 7 is a diagram showing examples of the drawing position adjustment point (part 2).

As shown in (a) of FIG. 7, the position of the first LF point LFPO1 can be adjusted so that the first LF point LFPO1 represented by the cross is positioned inside the second LF point LFPO2 represented by the circle, whereby the irradiation position of the first LF light distribution pattern can be adjusted to be situated in a correct position. When the position of the first LF point LFPO1 is adjusted, another drawing position adjusting point that differs from the second LF point LFPO2 and the first LF point LFPO1 can be obtained.

As shown in (b) of FIG. 7, illusional graphics such as a Cannizza triangle may be used. In the case shown in (b) of FIG. 7, the position of the first LF point LFPO1 can be adjusted so that a triangle appears by combining the second LF point LFPO2 represented by a partially missing circle and the first LF point LFPO1 represented by two partially missing circles, whereby the irradiation position of the first LF light distribution pattern can be adjusted to be situated in a correct position. When the position of the first LF point LFPO1 is adjusted, another drawing position adjusting point that differs from the second LF point LFPO2 and the first LF point LFPO1 can be obtained.

As shown in (c) of FIG. 7, the position of the first LF point LFPO1 can be adjusted so that the second LF point LFPO2 represented by the character string and the first LF point LFPO1 represented by another character string to form a preset character string set in advance, whereby the irradiation position of the first LF light distribution patterns can be adjusted to be situated in a correct position. When the position of the first LF point LFPO1 is adjusted, another drawing position adjusting point that differs from the second LF point LFPO2 and the first LF point LFPO1 can be obtained.

As shown in (d) of FIG. 7, the position of the first LF point LFPO1 can be adjusted so that the protruding portion of the first LF point LFPO1 is positioned in the recessed portion of the second LF point LFPO2 by using the second LF point LFPO2 represented by the concave shape and the first LF point LFPO1 represented by the convex shape, whereby the irradiation position of the first LF light distribution pattern can be adjusted to be situated in a correct position. When the position of the first LF point LFPO1 is adjusted, another drawing position adjusting point that differs from the second LF point LFPO2 and the first LF point LFPO1 can be obtained.

Figure 8:
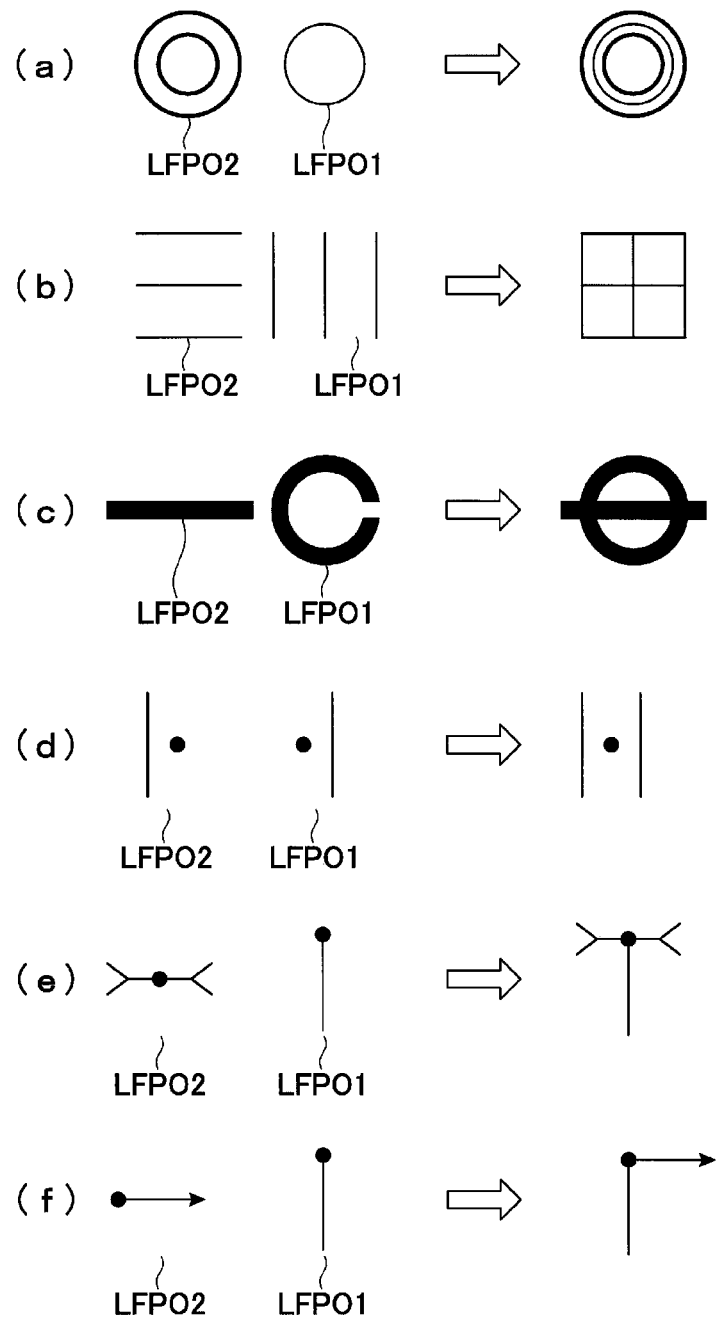
FIG. 8 is a diagram showing examples of the drawing position adjustment point (Part 3)

FIG. 8 is a diagram showing examples of the drawing position adjustment point (part 3).

As shown in (a) of FIG. 8, the position of the first LF point LFPO1 can be adjusted so that the first LF point LFPO1 represented by the smaller circle is positioned between two circles of the second LF point LFPO2 represented by the double circle, whereby the irradiation position of the first LF light distribution pattern can be adjusted to be situated in a correct position. When the position of the first LF point LFPO1 is adjusted, another drawing position adjusting point that differs from the second LF point LFPO2 and the first LF point LFPO1 can be obtained.

As shown in (b) of FIG. 8, the position of the first LF point LFPO1 can be adjusted so that the cross appears in the square by overlapping the first LF point LFPO1 represented by the three vertical lines with the second LF point LFPO2 represented by the three horizontal lines, whereby the irradiation position of the first LF light distribution pattern can be adjusted so as to be situated in a correct position. When the position of the first LF point LFPO1 is adjusted, another drawing position adjusting point that differs from the second LF point LFPO2 and the first LF point LFPO1 can be obtained.

As shown in (c) of FIG. 8, the position of the first LF point LFPO1 can be adjusted so that the first LF point LFPO1 represented by the Landolt ring overlaps with the second LF point LFPO2 represented by the lateral bar, so that the lateral bar appears in the Landolt ring, whereby the irradiation position of the first LF light distribution pattern can be adjusted to be situated in a correct position. When the position of the first LF point LFPO1 is adjusted, another drawing position adjusting point that differs from the second LF point LFPO2 and the first LF point LFPO1 can be obtained.

In addition, the position of the first LF point LFPO1 can be adjusted so that a Landolt ring appears by overlapping the first LF point LFPO1 represented by the Landolt ring with the second LF point LFPO2 represented by the Landolt ring, whereby the irradiation position of the first LF light distribution pattern can be adjusted to be situated in a correct position. When the position of the first LF point LFPO1 is adjusted, another drawing position adjusting point that differs from the second LF point LFPO2 and the first LF point LFPO1 can be obtained.

As shown in (d) of FIG. 8, the position of the first LF point LFPO1 can be adjusted so that the circle of the second LF point LFPO2 represented by the vertical line and the circle on the right side of the vertical line is overlapped with the circle of the first LF point LFPO1 represented by the vertical line and the circle on the left side of the vertical line, whereby the irradiation position of the first LF light distribution pattern can be adjusted to be situated in a correct position. When the position of the first LF point LFPO1 is adjusted, another drawing position adjusting point that differs from the second LF point LFPO2 and the first LF point LFPO1 can be obtained.

As shown in (e) of FIG. 8, the position of the first LF point LFPO1 can be adjusted so that the circle of the second LF point LFPO2 represented by the outward arrow wings attached to both ends of the horizontal line and the circle provided on the line segment is overlapped with the circle of the first LF point LFPO1 represented by the vertical line and the circle provided to one end of the vertical line whereby the vertical line is connected in an orthogonal manner to the horizontal line at both ends of which the outward arrow wings are attached. Thereby the irradiation position of the first LF light distribution pattern can be adjusted to be situated in a correct position. When the position of the first LF point LFPO1 is adjusted, another drawing position adjusting point that differs from the second LF point LFPO2 and the first LF point LFPO1 can be obtained.

As shown in (f) of FIG. 8, the position of the first LF point LFPO1 can be adjusted so that the circle of the second LF point LFPO2 represented by the horizontal line having an inward arrow attached to one end and the circle attached to the other end is overlapped with the circle of the first LF point LFPO1 represented by the vertical line and the circle provided to one end of the vertical line whereby the vertical line is connected in an orthogonal manner to the horizontal line at the other end opposite to the position of the inward arrow. Thereby the irradiation position of the first LF light distribution pattern is adjusted so as to be correct. When the position of the first LF point LFPO1 is adjusted, another drawing position adjusting point that differs from the second LF point LFPO2 and the first LF point LFPO1 can be obtained.

The second LF point LFPO2 and the first LF point LFPO1 shown in FIGS. 6 to 8 may be modified as follows: A portion shown in black and a portion shown in white may be inverted. The luminance of the second LF point LFPO2 may be set to differ from the luminance of the first LF point LFPO1. Further, a distance (color differences) in the color space may be provided between the second LF point LFPO2 and the first LF point LFPO1. The second LF point LFPO2 and the first LF point LFPO1 may have complementary colors. In addition, the second LF point LFPO2 may be represented by continuous lighting, and the first LF point LFPO1 may be represented by blinking.

In FIGS. 6 to 8, the cases where the position of the first LF point LFPO1 is adjusted on the basis of the second LF point LFPO2 have been described, but the presently disclosed subject matter is not limited thereto. For example, the presently disclosed subject matter can be applied to a case where the position of the first RF point RFPO1 is adjusted on the basis of the second RF point RFPO2, a case where the position of the first LR point LRPO1 is adjusted on the basis of the second LR point LRPO2, and a case where the position of the first RR point RRPO1 is adjusted on the basis of the second RR point RRPO2.

[Example of Procedure of Road Surface Drawing Adjustment Processing (Part 1)]

Figure 9:
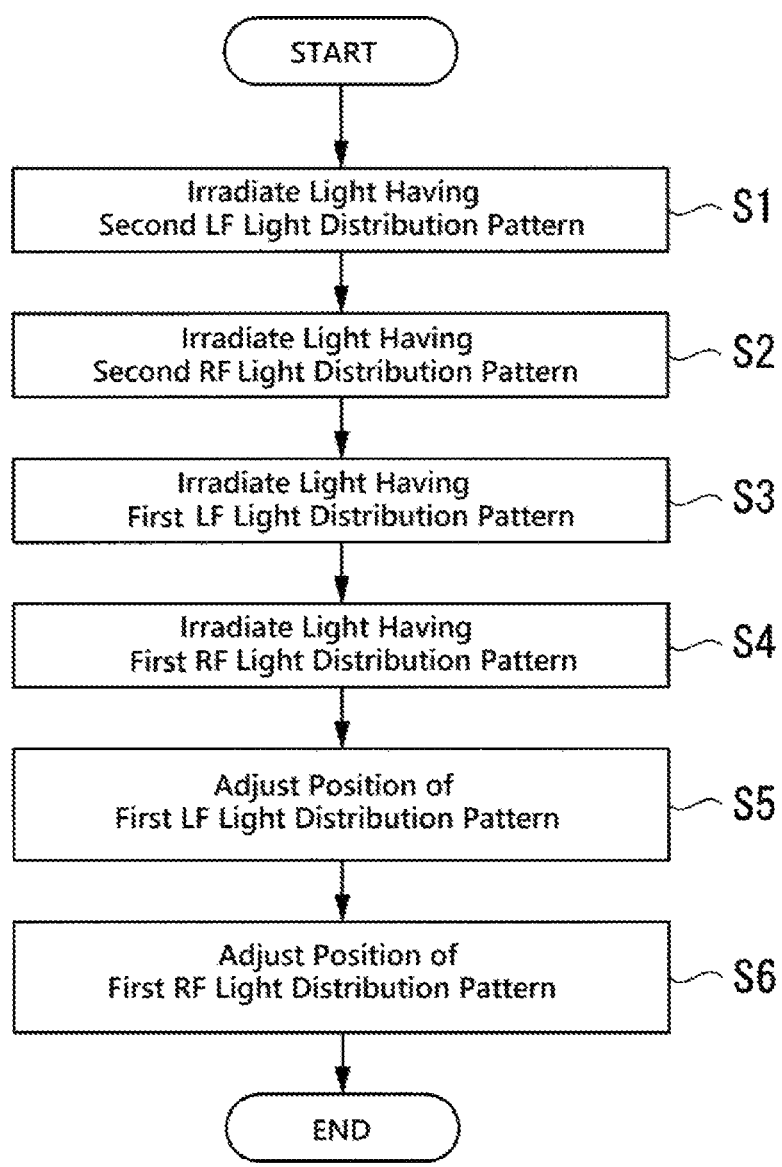
FIG. 9 is a flowchart showing an example of a procedure of road surface drawing adjustment processing performed on the illumination system 101 according to the exemplary embodiment of the presently disclosed subject matter (Part 1)

FIG. 9 is a flowchart showing an example of a procedure of road surface drawing adjustment processing performed on the illumination system 101 according to the exemplary embodiment of the presently disclosed subject matter (Part 1).

In this example, it is assumed that a vehicle mechanic maintains the vehicle 1. The automobile mechanic adjusts the irradiation position of the first LF light distribution pattern of light irradiated by the left road surface drawing portion 20L and the irradiation position of the first RF light distribution pattern of light irradiated by the right road surface drawing portion 20R.

(Step S1)

The light distribution control unit 33 causes the left headlamp 14L to irradiate the light having the second LF light distribution pattern, whereby the left headlamp 14L irradiates the light having the second LF light distribution pattern.

(Step S2)

The light distribution control unit 33 causes the right headlamp 14R to irradiate the light having the second RF light distribution pattern, whereby the right headlamp 14R irradiates the light having the second RF light distribution pattern.

(Step S3)

The light distribution control unit 33 causes the left road surface drawing portion 20L to irradiate light having the first LF light distribution pattern, whereby the left road surface drawing portion 20L irradiates the light having the first LF light distribution pattern.

(Step S4)

The light distribution control unit 33 causes the right road surface drawing portion 20R to irradiate light having the first RF light distribution pattern, whereby the right road surface drawing portion 20R irradiates the light having the first RF light distribution pattern.

(Step S5)

The automobile mechanic adjusts the changing unit 40 to adjust (for example, shift) the position of the first LF point included in the first LF light distribution pattern of light irradiated by the left road surface drawing portion 20L on the basis of the position of the second LF point included in the second LF light distribution pattern of light irradiated by the left headlamp 14L. As a result, the irradiation position of the first LF light distribution pattern is adjusted.

(Step S6)

The automobile mechanic adjusts the changing unit 40 to adjust the position of the first RF point included in the first RF light distribution pattern of light irradiated by the right road surface drawing portion 20R on the basis of the position of the second RF point included in the second RF light distribution pattern of light irradiated by the right headlamp 14R. As a result, the irradiation position of the first RF light distribution pattern is adjusted.

In the flowchart shown in FIG. 9, the processes of Steps S1 to S4 may be interchanged. The order of Steps S5 and S6 may be reversed. The processes may be performed in the order of Steps S1, S2, S5, S3, S4, and S6, or may be performed in the order of Steps S3, S4, S6, S1, S2, and S5.

[Example of Procedure of Road Surface Drawing Adjustment Processing (Part 2)]

Figure 10:
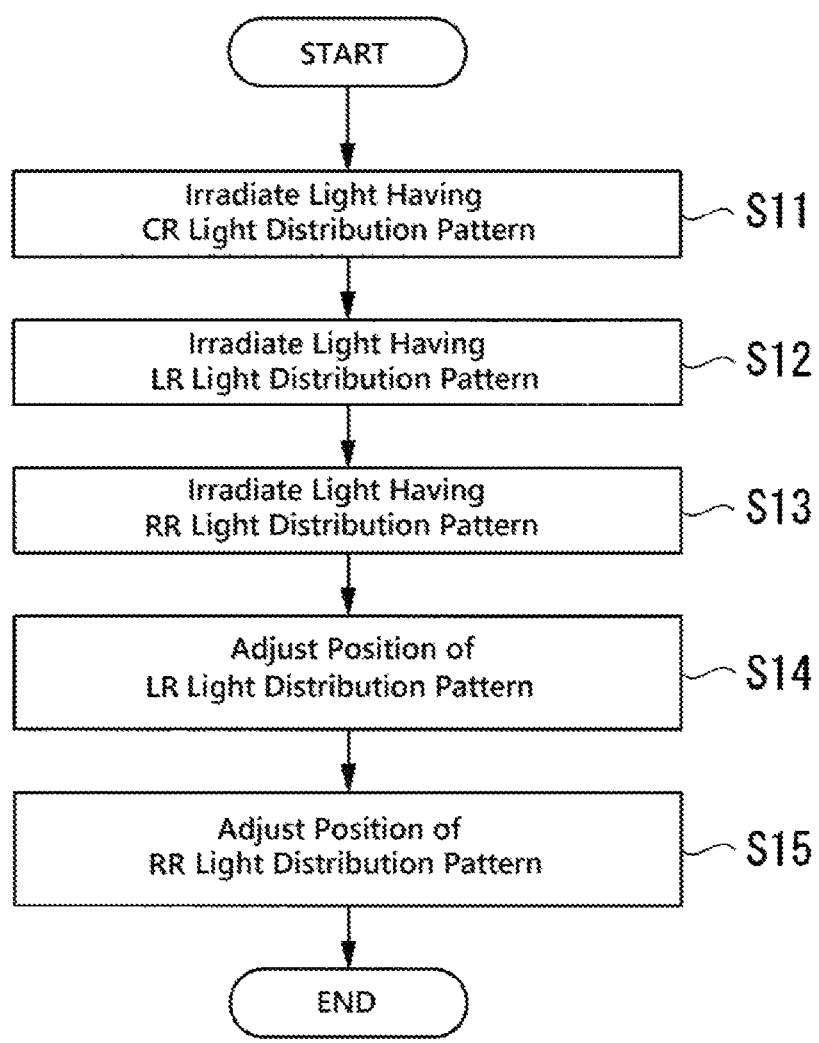
FIG. 10 is a flowchart showing the example of the procedure of road surface drawing adjustment processing performed on the illumination system 101 according to the exemplary embodiment of the presently disclosed subject matter (Part 2)

FIG. 10 is a flowchart showing an example of a procedure of road surface drawing adjustment processing performed on the illumination system 101 according to an exemplary embodiment of the presently disclosed subject matter (Part 2).

In this example, it is assumed that a vehicle mechanic maintains the vehicle 1. The automobile mechanic adjusts the irradiation position of the LR light distribution pattern of light irradiated by the left-rear road surface drawing portion 18L and the irradiation position of the RR light distribution pattern of light irradiated by the right-rear road surface drawing portion 18R.

(Step S11)

The light distribution control unit 33 causes the center-rear road surface drawing portion 19C to irradiate the light having the CR light distribution pattern, whereby the center-rear road surface drawing portion 19C irradiates the light having the CR light distribution pattern.

(Step S12)

The light distribution control unit 33 causes the left-rear road surface drawing portion 18L to irradiate the light having the LR light distribution pattern, whereby the left-rear road surface drawing portion 18L irradiates the light having the LR light distribution pattern.

(Step S13)

The light distribution control unit 33 causes the right-rear road surface drawing portion 18R to irradiate the light having the RR light distribution pattern, whereby the right-rear road surface drawing portion 18R irradiates the light having the RR light distribution pattern.

(Step S14)

The automobile mechanic adjusts the changing unit 40 to adjust the position of the first LR point included in the LR light distribution pattern of light irradiated by the left-rear road surface drawing portion 18L on the basis of the position of the second LR point included in the CR light distribution pattern of light irradiated by the center-rear road surface drawing portion 19C. As a result, the irradiation position of the LR light distribution pattern is adjusted.

(Step S15)

The automobile mechanic adjusts the changing unit 40 to adjust the position of the first RR point included in the RR light distribution pattern of light irradiated by the right-rear road surface drawing portion 18R on the basis of the position of the second RR point included in the CR light distribution pattern of light projected by the center-rear road surface drawing portion 19C. As a result, the irradiation position of the RR light distribution pattern is adjusted.

In the flowchart shown in FIG. 10, the processes of Steps S11 to S13 may be interchanged. The order of Steps S14 and S15 may be reversed. The processes may be performed in the order of Steps S11, S12, S14, S13, and S15, or may be performed in the order of Steps S11, S13, S15, S12, and S14.

In the exemplary embodiment described above, a description has been given of the case, as an example, where the second LF point LFPO2 included in the second LF light distribution pattern of light irradiated by the left headlamp 14L coincides with the second RF point RFPO2 included in the second RF light distribution pattern of light irradiated by the right headlamp 14R, but the presently disclosed subject matter is not limited to this example.

For example, the second LF point LFPO2 may not coincide with the second RF point RFPO2. In this instance, the user may adjust the changing unit 40 to adjust the position of the first LF point LFPO1 included in the first LF light distribution pattern LFPA1 of light irradiated by the left road surface drawing portion 20L on the basis of the second LF point LFPO2 included in the second LF light distribution pattern LFPA2 of light irradiated by the left headlamp 14L.

Further, the user may adjust the changing unit 40 to adjust the position of the first RF point RRPO1 included in the first RF light distribution pattern RFPA1 of light irradiated by the right road surface drawing portion 20R on the basis of the second RF point RFPO2 included in the second RF light distribution pattern RFPA2 of light irradiated by the right headlamp 14R.

In the exemplary embodiment described above, a description has been given of the case, as an example, where the second LF point LFPO2 included in the second LF light distribution pattern of light irradiated by the left headlamp 14L and the second RF point RFPO2 included in the second RF light distribution pattern of light irradiated by the right headlamp 14R are used to adjust the irradiation position of the first LF light distribution pattern LFPA1 of light irradiated by the left road surface drawing portion 20L and the irradiation position of the first RF light distribution pattern RFPA1 of light irradiated by the right road surface drawing portion 20R. However, the presently disclosed subject matter is not limited to this example.

For example, either the second LF point LFPO2 included in the second LF light distribution pattern of light irradiated by the left headlamp 14L or the second RF point RFPO2 included in the second RF light distribution pattern of light irradiated by the right headlamp 14R may be used to adjust the irradiation position of the first LF light distribution pattern LFPA1 of light irradiated by the left road surface drawing portion 20L and the irradiation position of the first RF light distribution pattern RFPA1 of light irradiated by the right road surface drawing portion 20R.

Further, for example, the irradiation position of the first LF light distribution pattern LFPA1 of light irradiated by the left road surface drawing portion 20L and the irradiation position of the first RF light distribution pattern RFPA1 of light irradiated by the right road surface drawing portion 20R may be adjusted on the basis of one or both of the first LF point included in the first LF light distribution pattern LFPA1 of light irradiated by the left road surface drawing portion 20L and the first RF point included in the first RF light distribution pattern RFPA1 of light irradiated by the right road surface drawing portion 20R. With this configuration, the second LF light distribution pattern of light irradiated by the left headlamp 14L and the second RF light distribution pattern of light irradiated by the right headlamp 14R can be unnecessary.

In the exemplary embodiment described above, a description has been given of the case, as an example, where the second LF point LFPO2 included in the second LF light distribution pattern of light projected to the road surface by the left headlamp 14L and the second RF point RFPO2 included in the second RF light distribution pattern of light projected to the road surface by the right headlamp 14R are used to adjust the irradiation position of the first LF light distribution pattern LFPA1 of light projected to the road surface by the left road surface drawing portion 20L and the irradiation position of the first RF light distribution pattern RFPA1 of light projected to the road surface by the right road surface drawing portion 20R. However, the presently disclosed subject matter is not limited to this example.

For example, a screen may be provided in front of the automobile 1 perpendicularly to the road surface in front of the automobile 1, and the second LF point LFPO2 included in the second LF light distribution pattern of light projected on the screen by the left headlamp 14L and the second RF point RFPO2 included in the second RF light distribution pattern of light projected on the screen by the right headlamp 14R may be used to adjust the irradiation position of the first LF light distribution pattern LFPA1 of light projected on the screen by the left road surface drawing portion 20L and the irradiation position of the first RF light distribution pattern RFPA1 of light projected on the screen by the right road surface drawing portion 20R.

In addition, the projection target is not limited to a road surface or the like in a two-dimensional manner, but the adjustment may be performed in a three-dimensional manner. For example, the second LF point LFPO2 included in the second LF light distribution pattern of light irradiated by the left headlamp 14L and the second RF point RFPO2 included in the second RF light distribution pattern of light irradiated by the right headlamp 14R may be used to three-dimensionally adjust the irradiation position of the first LF light distribution pattern LFPA1 of light irradiated by the left road surface drawing portion 20L and the irradiation position of the first RF light distribution pattern RFPA1 of light irradiated by the right road surface drawing portion 20R.

In the exemplary embodiment described above, a description has been given of the case, as an example, where the second LF point LFPO2 included in the second LF light distribution pattern of light irradiated by the left headlamp 14L and the second RF point RFPO2 included in the second RF light distribution pattern of light irradiated by the right headlamp 14R are used to adjust the irradiation position of the first LF light distribution pattern LFPA1 of light irradiated by the left road surface drawing portion 20L and the irradiation position of the first RF light distribution pattern RFPA1 of light irradiated by the right road surface drawing portion 20R. However, the presently disclosed subject matter is not limited to this example.

For example, the headlamp configured to irradiate light having the second LF light distribution pattern may be provided separately from the left headlamp 14L, or the headlamp configured to irradiate light having the second RF light distribution pattern may be provided separately from the right headlamp 14R. In addition, a headlamp configured to irradiate light having the second LF light distribution pattern and light having the second RF light distribution pattern may be separately provided.

In the exemplary embodiment described above, a description has been given of the case, as an example, where the second LR point and the second RR point are included in the CR light distribution pattern of light irradiated by the center-rear road surface drawing portion 19C, but the presently disclosed subject matter is not limited to this example. For example, the second LR point and the second RR point may be indicated by a single drawing position adjustment point.

In the exemplary embodiment described above, a description has been given of the case, as an example, where the second LR point and the second RR point included in the CR light distribution pattern of light irradiated by the center-rear road surface drawing portion 19C are used to adjust the irradiation position of the LR light distribution pattern of light irradiated by the left-rear road surface drawing portion 18L and the irradiation position of the RR light distribution pattern of light irradiated by the right-rear road surface drawing portion 18R, but the presently disclosed subject matter is not limited to this example. For example, a tail lamp configured to irradiate the second LR point and the second RR point may be provided separately from the center-rear road surface drawing portion 19C.

In the exemplary embodiment described above, a description has been given of the case, as an example, where the second LR point and the second RR point included in the CR light distribution pattern of light projected on the road surface by the center-rear road surface drawing portion 19C to adjust the irradiation position of the LR light distribution pattern of light projected on the road surface by the left-rear road surface drawing portion 18L and the irradiation position of the RR light distribution pattern of light projected on the road surface by the right-rear road surface drawing portion 18R, but the presently disclosed subject matter is not limited to this example. For example, a screen may be provided in the rear of the automobile 1 perpendicularly to the road surface in the rear of the automobile 1, and the second LR point and the second RR point included in the CR light distribution pattern of light projected on the screen by the center-rear road surface drawing portion 19C may be used to adjust the irradiation position of the LR light distribution pattern of light projected on the screen by the left-rear road surface drawing portion 18L and the irradiation position of the RR light distribution pattern of light projected on the screen by the right-rear road surface drawing portion 18R.

In addition, the projection target is not limited to a road surface or the like in a two-dimensional manner, but the adjustment may be performed in a three-dimensional manner. For example, the second LR point and the second RR point included in the CR light distribution pattern of light irradiated by the center-rear road surface drawing portion 19C may be used to three-dimensionally adjust the irradiation position of the LR light distribution pattern of light irradiated by the left-rear road surface drawing portion 18L and the irradiation position of the RR light distribution pattern of light irradiated by the right-rear road surface drawing portion 18R.

The illumination device according to the first exemplary embodiment may include the left road surface drawing portion 20L configured to irradiate light having the first LF light distribution pattern and the right road surface drawing portion 20R configured to irradiate light having the first RF light distribution pattern, and the left headlamp 14L configured to irradiate light having the second LF light distribution pattern and the right headlamp 14R configured to irradiate light having the second RF light distribution pattern, and any of the patterns can include a drawing position adjusting point.

With this configuration in which the second LF light distribution pattern includes the second LF point and the first LF light distribution pattern includes the first LF point, the position of the first LF point included in the first LF light distribution pattern can be adjusted on the basis of the second LF point included in the second LF light distribution pattern. Deviation of the irradiation position of the low beam for irradiating the second LF light distribution pattern by the left headlamp 14L is assumed to be smaller than that of other lamps by the adjustment of periodic inspection or the like. Therefore, the position of the first LF point included in the first LF light distribution pattern can be adjusted on the basis of the second LF point included in the second LF light distribution pattern of light by the low beam of the left headlamp 14L, whereby the irradiation position can be adjusted to a correct position. Since the irradiation position can be adjusted to a correct position, distortion and blurring of the drawing pattern can be reduced.

Further, with the configuration in which the second RF light distribution pattern includes the second RF point and the first RF light distribution pattern includes the first RF point, the position of the first RF point included in the first RF light distribution pattern can be adjusted on the basis of the second RF point included in the second RF light distribution pattern. Deviation of the irradiation position of the low beam for irradiating the second RF light distribution pattern by the right headlamp 14R is assumed to be smaller than that of other lamps by the adjustment of periodic inspection or the like. Therefore, the position of the first RF point included in the first RF light distribution pattern can be adjusted on the basis of the second RF point included in the second RF light distribution pattern of light by the low beam of the right headlamp 14R, whereby the irradiation position can be adjusted to a correct position. Since the irradiation position can be adjusted to a correct position, distortion and blurring of the drawing pattern can be reduced.

In addition, the illumination device according to the first exemplary embodiment may include the left-rear road surface drawing portion 18L configured to irradiate light having the LR light distribution pattern, the right-rear road surface drawing portion 18R configured to irradiate light having the RR light distribution pattern, and the center-rear road surface drawing portion 19C configured to irradiate light having the CR light distribution pattern.

With this configuration, the position of the first LR point included in the LR light distribution pattern can be adjusted on the basis of the second LR point included in the CR light distribution pattern, and consequently, the irradiation position can be adjusted to a correct position. Since the irradiation position can be adjusted to a correct position, distortion and blurring of the drawing pattern can be reduced. In addition, the position of the first RR point included in the RR light distribution pattern can be adjusted on the basis of the second RR point included in the CR light distribution pattern, and consequently the irradiation position can be adjusted to a correct position. Since the irradiation position can be adjusted to a correct position, distortion and blurring of the drawing pattern can be reduced.

[Second Exemplary Embodiment]

The illumination device according to the present exemplary embodiment is different from the illumination system according to the first exemplary embodiment in that the irradiation position of the first LF light distribution pattern of the left road surface drawing portion 20L, the irradiation position of the first RF light distribution pattern of the right road surface drawing portion 20R, the irradiation position of the LR light distribution pattern of the left-rear road surface drawing portion 18L, and the irradiation position of the RR light distribution pattern of the right-rear road surface drawing portion 18R can be automatically adjusted.

[Schematic Configuration of Automobile]

Figure 11:
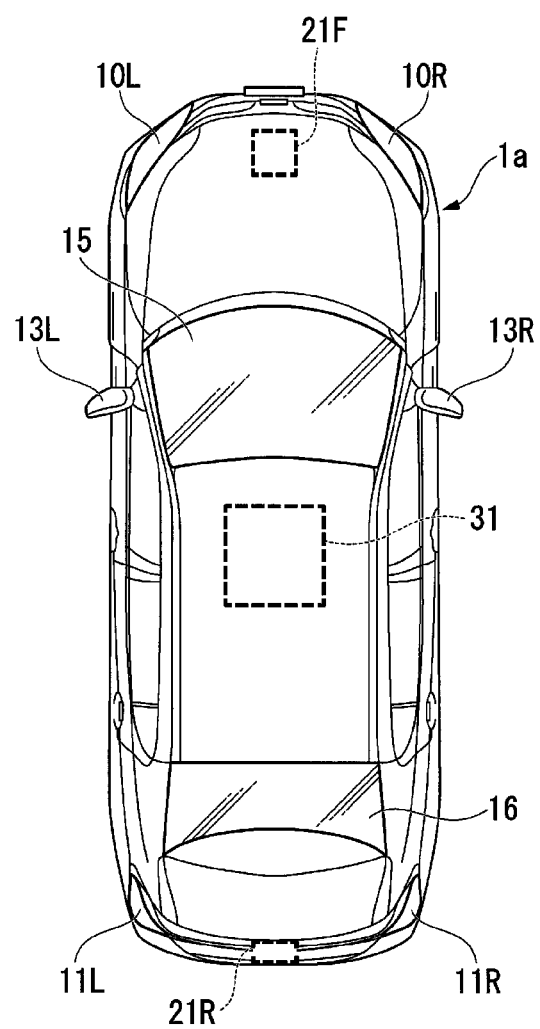
FIG. 11 is a block diagram showing a schematic configuration of an automobile 1a according to an exemplary embodiment of the presently disclosed subject matter.

FIG. 11 is a block diagram showing a schematic configuration of an automobile 1a having the illumination device according to the exemplary embodiment of the presently disclosed subject matter.

The automobile 1a can be configured to include the automobile 1 having the illumination device according to the first exemplary embodiment described above, a front vehicle outside detection unit (referred to as an FO detection unit 21F in the present exemplary embodiment), and a rear vehicle outside detection unit (referred to as an RO detection unit 21R in the present exemplary embodiment).

Part or all the FO detection unit 21F and the RO detection unit 21R may be provided inside the automobile 1a without being observed in the appearance of the automobile 1a.

[Schematic Functional Configuration of Control System of Automobile]

Figure 12:
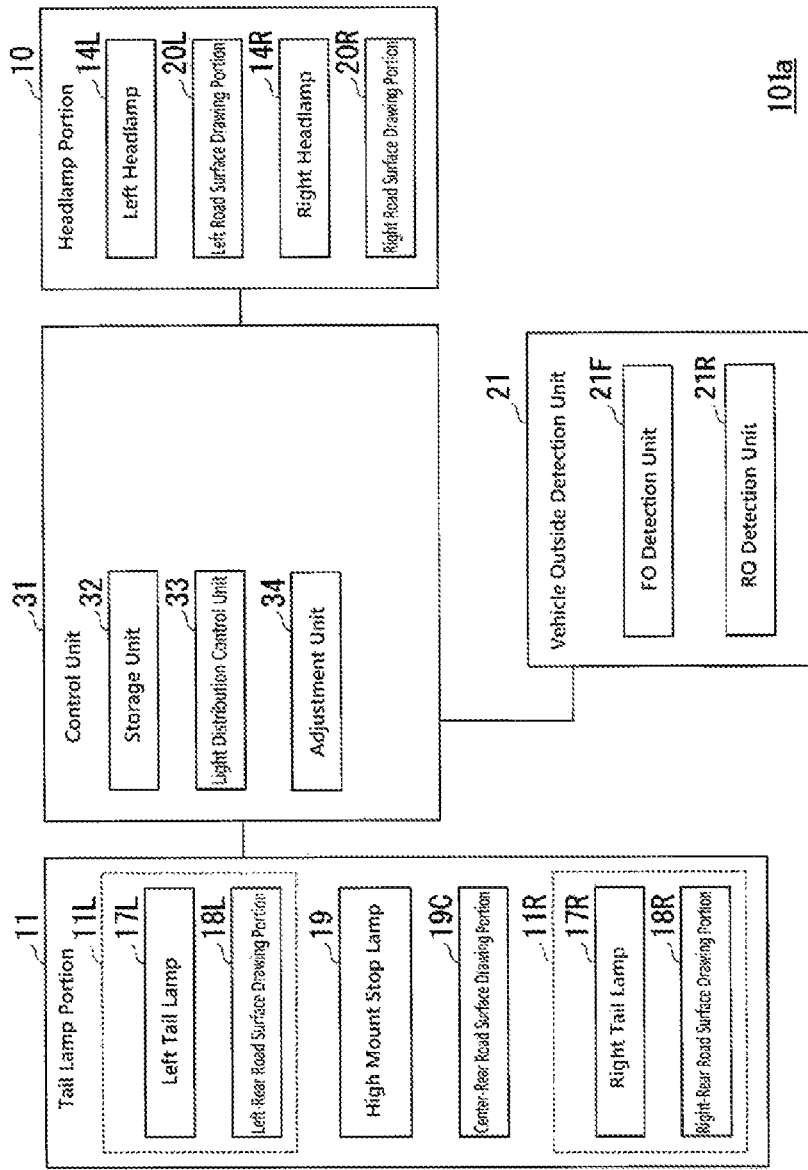
FIG. 12 is a functional block diagram showing a schematic functional configuration of an illumination system 101a provided in the automobile 1a according to the exemplary embodiment of the presently disclosed subject matter.

FIG. 12 is a functional block diagram showing a schematic functional configuration of an illumination system 101a provided in the automobile 1a according to the exemplary embodiment of the presently disclosed subject matter.

The illumination system 101a is different from the illumination system 101 described above in that the changing unit 40 is eliminated. Further, the illumination system 101a is different from the illumination system 101 in that the control unit 31 of the illumination system 101 includes an adjustment unit 34 and a vehicle outside detection unit 21 connected to the control unit 31 is provided to the automobile 1a. Herein, the vehicle outside detection unit 21 can include the FO detection unit 21F and the RO detection unit 21R.

The vehicle outside detection unit 21 can detect information on matters outside the automobile 1a (also referred to as "outside/vehicle exterior" in the present exemplary embodiment). Specifically, the vehicle outside detection unit 21 can be configured to recognize the area where the left and right road surface drawing portions 20L and 20R project light having respective patterns, for example. The vehicle outside detection unit 21 can detect each of the patterns to generate and output a signal of information of the patterns to the adjustment unit, and the adjustment unit acquires the signals outputted by the vehicle outside detection unit 21 to move at least one of the left and right road surface drawing portions 20L and 20R so that the left and right road surface drawing portions 20L and 20R project respective light to a desired position. In this case, the signal of information outputted by the vehicle outside detection unit 21 may be position information of the patterns drawn by the left and right road surface drawing portions 20L and 20R. More specifically, the FO detection unit 21F can detect information on the outside in front of the automobile 1a. The RO detection unit 21R can detect information on the outside behind the automobile 1a. In the present exemplary embodiment, the automobile 1a can include the FO detection unit 21F and the RO detection unit 21R, but as another configuration example, one or both may not be included.

As another configuration example, the automobile 1a may include another vehicle outside detection unit (also referred to as an SO detection unit in the present exemplary embodiment) that can detect information on the outside of the automobile 1a sideward (leftward and rightward). As the SO detection unit, for example, an SO detection unit on the right side with respect to the traveling direction of the automobile 1a and an SO detection unit on the left side with respect to the traveling direction of the automobile 1a may be used.

The FO detection unit 21F may include a detection unit configured to detect arbitrary information on the front outside of the vehicle. The FO detection unit 21F may include, for example, a camera or the like imaging device. The camera or the like imaging device may have, for example, a function of detecting visible light, a function of detecting infrared light, or both.

Similarly, the RO detection unit 21R may include a detection unit configured to detect arbitrary information on the rear outside of the vehicle.

When the SO detection unit is provided, the SO detection unit may similarly include a detection unit configured to detect arbitrary information relating to the outside of the vehicle on the side. Herein, the camera can detect, for example, information of an image obtained by photographing a predetermined object.

The FO detection unit 21F can detect the second LF light distribution pattern of light irradiated by the left headlamp 14L, the first LF light distribution pattern of light irradiated by the left road surface drawing portion 20L, the first RF light distribution pattern of light irradiated by the right headlamp 14R, and a second RF light distribution pattern of light irradiated by the right road surface drawing portion 20R. The FO detection unit 21F can detect the second LF point included in the second LF light distribution pattern, the first LF point included in the first LF light distribution pattern, the first RF point included in the first RF light distribution pattern, and the second RF point included in the second RF light distribution pattern. The FO detection unit 21F can derive the position information of the second LF point, the position information of the first LF point, the position information of the first RF point, and the position information of the first RF point.

For example, the FO detection unit 21F may derive each position information by performing image processing on the detected second LF point, first LF point, first RF point, and second RF point.

The FO detection unit 21F can output the derived position information of the second LF point, the derived position information of the first LF point, the derived position information of the first RF point, and the derived position information of the second RF point to the adjustment unit 34.

The RO detection unit 21R can detect the LR light distribution pattern of light irradiated by the left-rear road surface drawing portion 18L, the CR light distribution pattern of light irradiated by the center-rear road surface drawing portion 19C, and the RR light distribution pattern of light irradiated by the right-rear road surface drawing portion 18R. Then, the RO detection unit 21R detects the first LR point included in the LR light distribution pattern, the second LR point included in the CR light distribution pattern, the second RR point, and the first RR point included in the RR light distribution pattern. The RO detection unit 21R can derive the position information of the first LR point, the position information of the second LR point, the position information of the second RR point, and the position information of the first RR point.

For example, the RO detection unit 21R may derive each position information by performing image processing on the detected first LR point, second LR point, second RR point, and first RR point.

The RO detection unit 21R can output the derived position information of the first LR point, the derived position information of the second LR point, the derived position information of the second RR point, and the derived position information of the first RR point to the adjustment unit 34.

The adjustment unit 34 can acquire the position information of the second LF point, the position information of the first LF point, the position information of the first RF point, and the position information of the second RF point, which have been output from the FO detecting unit 21F.

The adjustment unit 34 can change the irradiation position by the left road surface drawing portion 20L, which is configured to irradiate light having the first LF light distribution pattern, on the basis of the acquired position information of the second LF point and the acquired position information of the first LF point. Specifically, the adjustment unit 34 can adjust the position of the first LF point included in the first LF light distribution pattern of light irradiated by the left road surface drawing portion 20L on the basis of the second LF point included in the second LF light distribution pattern of light irradiated by the left headlamp 14L.

In addition, the adjustment unit 34 can change the irradiation position by the right road surface drawing portion 20R, which is configured to irradiate light having the first RF light distribution pattern, on the basis of the acquired position information of the first RF point and the acquired position information of the second RF point. Specifically, the adjustment unit 34 can adjust the position of the first RF point included in the first RF light distribution pattern of light irradiated by the right road surface drawing portion 20R on the basis of the second RF point included in the second RF light distribution pattern of light irradiated by the right headlamp 14R.

The adjustment unit 34 can acquire the position information of the first LR point, the position information of the second LR point, the position information of the second RR point, and the position information of the first RR point, which have been output from the RO detecting unit 21R.

The adjustment unit 34 can change the irradiation position by the left-rear road surface drawing portion 18L, which is configured to irradiate light having the LR light distribution pattern, on the basis of the acquired position information of the first LR point and the acquired position information of the second LR point. Specifically, the adjustment unit 34 can adjust the position of the first LR point included in the LR light distribution pattern of light irradiated by the left-rear road surface drawing portion 18L on the basis of the second LR point included in the CR light distribution pattern of light irradiated by the center-rear road surface drawing portion 19C.

In addition, the adjustment unit 34 can change the irradiation position by the right-rear road surface drawing portion 18R, which is configured to irradiate light having the RR light distribution pattern, on the basis of the acquired position information of the first RR point and the acquired position information of the second RR point. Specifically, the adjustment unit 34 can adjust the position of the first RR point included in the LR light distribution pattern of light irradiated by the right-rear road surface drawing portion 18R on the basis of the second RR point included in the CR light distribution pattern of light irradiated by the center-rear road surface drawing portion 19C.

[Example of Procedure of Road Surface Drawing Adjustment Processing (Part 1)]

Figure 13:
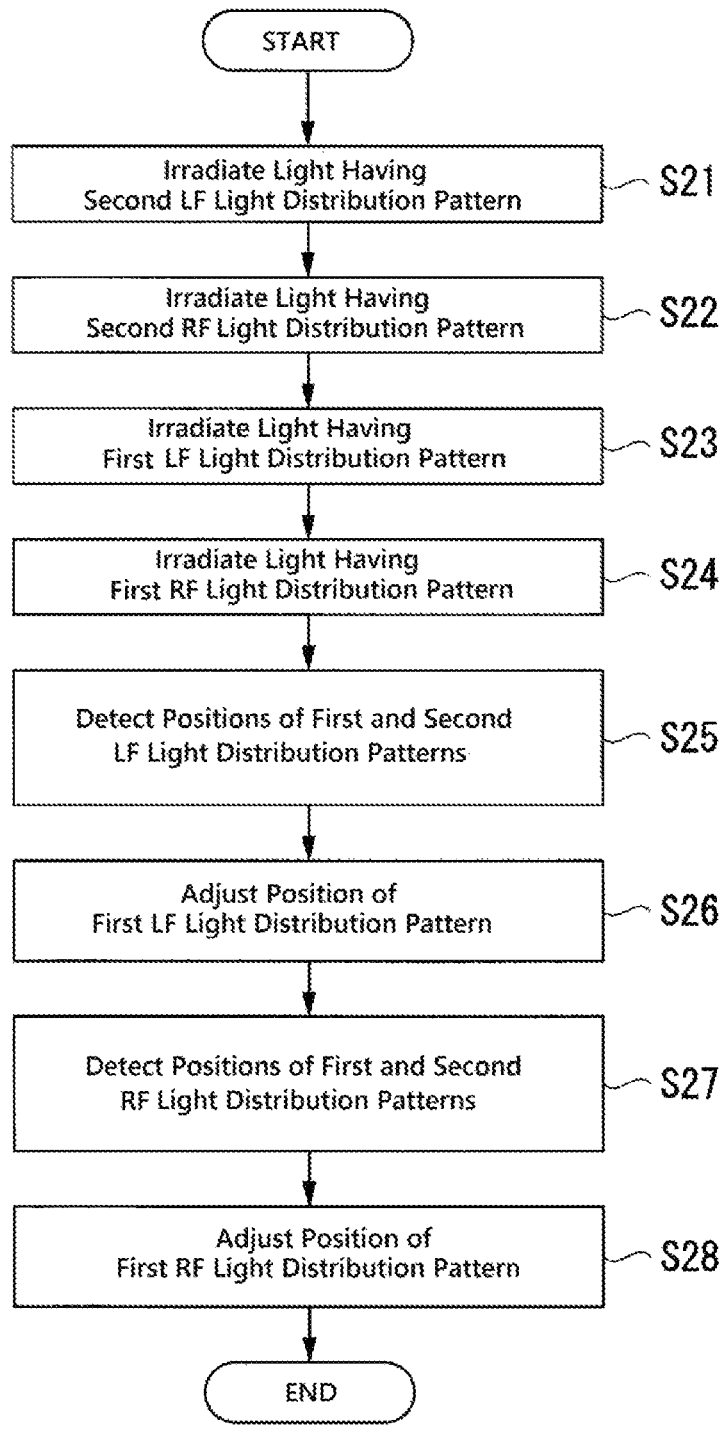
FIG. 13 is a flowchart showing an example of a procedure of road surface drawing adjustment processing performed on the illumination system according to the exemplary embodiment of the presently disclosed subject matter (Part 1)

FIG. 13 is a flowchart showing an example of a procedure of road surface drawing adjustment processing performed on the illumination system according to the exemplary embodiment of the present invention.

In this example, the automobile 1 can automatically adjust the irradiation position of the first LF light distribution pattern of light irradiated by the left road surface drawing portion 20L and the irradiation position of the first RF light distribution pattern of light irradiated by the right road surface drawing portion 20R.

Herein, Steps S1 to S4 shown in FIG. 9 can be applied to Steps S21 to S24, respectively.

(Step S25)

The FO detection unit 21F can detect the second LF light distribution pattern of light irradiated by the left headlamp 14L and the first LF light distribution pattern of light irradiated by the left road surface drawing portion 20L. The FO detection unit 21F can detect the position information of the second LF point included in the second LF light distribution pattern and the position information of the first LF point included in the first LF light distribution pattern.

(Step S26)

The adjustment unit 34 can adjust the position of the first LF point included in the first LF light distribution pattern of light irradiated by the left road surface drawing portion 20L on the basis of the position of the second LF point included in the second LF light distribution pattern of light irradiated by the left headlamp 14L. As a result, the irradiation position of the first LF light distribution pattern can be adjusted.

(Step S27)

The FO detection unit 21F can detect the second RF light distribution pattern of light irradiated by the right headlamp 14R and the first RF light distribution pattern of light irradiated by the right road surface drawing portion 20R. The FO detection unit 21F can detect the position information of the second RF point included in the second RF light distribution pattern and the position information of the first RF point included in the first RF light distribution pattern.

(Step S28)

The adjustment unit 34 can adjust the position of the first RF point included in the first RF light distribution pattern of light irradiated by the right road surface drawing portion 20R on the basis of the position of the second RF point included in the second RF light distribution pattern of light irradiated by the right headlamp 14R. As a result, the irradiation position of the first RF light distribution pattern can be adjusted.

In the flowchart shown in FIG. 13, the processes of Steps S21 to S24 may be interchanged. The order of Steps S25 to S26 and the order of S27 to S28 may be reversed. The processes may be performed in the order of Steps S21, S23, S25, S26, S22, S24, S27, and S28, or in the order of Steps S22, S24, S27, S28, S21, S23, S25, and S26.

[Example of Procedure of Road Surface Drawing Adjustment Processing (Part 2)]

Figure 14:
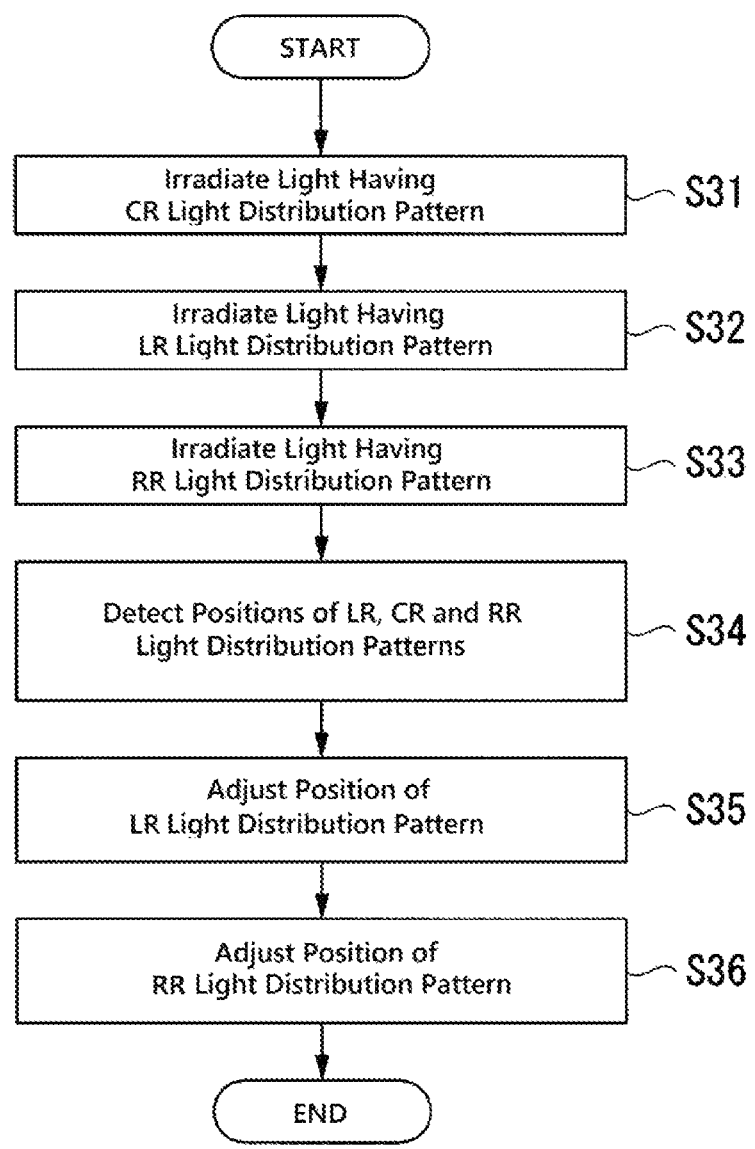
FIG. 14 is a flowchart showing the example of the procedure of road surface drawing adjustment processing performed on the illumination system according to the exemplary embodiment of the presently disclosed subject matter (Part 2).

FIG. 14 is a flowchart showing an example of a procedure of road surface drawing adjustment processing performed on the illumination system according to an exemplary embodiment of the presently disclosed subject matter (Part 2).

In this example, the automobile 1 can automatically adjust the irradiation position of the LR light distribution pattern of light irradiated by the left-rear road surface drawing portion 18L and the irradiation position of the RR light distribution pattern of light irradiated by the right-rear road surface drawing portion 18R.

Herein, Steps S11 to S13 shown in FIG. 10 can be applied to Steps S31 to S33, respectively.

(Step S34)

The RO detection unit 21R can detect the LR light distribution pattern of light irradiated by the left-rear road surface drawing portion 18L, the CR light distribution pattern of light irradiated by the center-rear road surface drawing portion 19C, and the RR light distribution pattern of light irradiated by the right-rear road surface drawing portion 18R. The RO detection unit 21R can detect the position information of the first LR point included in the LR light distribution pattern, the position information of the second LR point included in the CR light distribution pattern, the position information of the second RR point, and the position information of the first RR point included in the RR light distribution pattern.

(Step S35)

The adjustment unit 34 can adjust the position of the first LR point included in the LR light distribution pattern of light irradiated by the left-rear road surface drawing portion 18L on the basis of the position of the second LR point included in the CR light distribution pattern of light irradiated by the center-rear road surface drawing portion 19C. As a result, the irradiation position of the LR light distribution pattern can be adjusted.

(Step S36)

The adjustment unit 34 can adjust the position of the first RR point included in the RR light distribution pattern of light irradiated by the right-rear road surface drawing portion 18R on the basis of the position of the second RR point included in the CR light distribution pattern of light irradiated by the center-rear road surface drawing portion 19C. As a result, the irradiation position of the RR light distribution pattern can be adjusted.

In the flowchart shown in FIG. 14, the processes of Steps S31 to S33 may be interchanged. The order of Steps S35 and S36 may be reversed. The processes may be performed in the order of Steps S31, S32, S34, S35, S33, S34, and S36, or in the order of Steps S31, S33, S34, S36, S32, S34, and S35.

In the exemplary embodiment described above, a description has been given of the case where the FO detecting unit 21F detects the position information of the second RF point and the position information of the first RF point, and the adjustment unit 34 adjusts the position of the first RF point included in the first RF light distribution pattern of light irradiated by the right road surface drawing portion 20R on the basis of the position of the second RF point included in the second RF light distribution pattern of light irradiated by the right headlamp 14R, but the presently disclosed subject matter is not limited to this example.

For example, the SO detection unit may detect the position information of a first lateral drawing position adjustment point included in a first lateral light distribution pattern of light irradiated by a lateral road surface drawing unit provided to the side of the automobile 1a and the position information of a second lateral drawing position adjustment point included in a second lateral light distribution pattern of light irradiated by a lateral irradiation unit, and the adjustment unit 34 may adjust the position of the first lateral drawing position adjustment point included in the first lateral light distribution pattern of light irradiated by the lateral road surface drawing unit on the basis of the position of the second lateral drawing position adjustment point of light irradiated by the lateral irradiation unit.

The illumination device according to the second exemplary embodiment can include the left road surface drawing portion 20L configured to irradiate light having the first LF light distribution pattern and the right road surface drawing portion 20R configured to irradiate light having the first RF light distribution pattern, and the left headlamp 14L configured to irradiate light having the second LF light distribution pattern and the right headlamp 14R configured to irradiate light having the second RF light distribution pattern, and any of the patterns can include a drawing position adjusting point. The illumination device can further include the detection unit configured to detect any one or both of the first LF light distribution pattern and the first RF light distribution pattern, and the second LF light distribution pattern and the second RF light distribution pattern, drawn on the road surface, and an adjustment unit configured to adjust any one or both of the first LF light distribution pattern and the first RF light distribution pattern.

With this configuration in which the second LF light distribution pattern includes the second LF point and the first LF light distribution pattern includes the first LF point, the position of the first LF point included in the first LF light distribution pattern can be automatically adjusted on the basis of the second LF point included in the second LF light distribution pattern. The irradiation position of the low beam for irradiating the second LF light distribution pattern by the left headlamp 14L can be adjusted by periodic inspection or the like, so that the deviation of the irradiation position is assumed to be smaller than that of other lamps. Therefore, the position of the first LF point included in the first LF light distribution pattern can be automatically adjusted on the basis of the second LF point included in the second LF light distribution pattern of light with the low beam irradiated by the left headlamp 14L, whereby the irradiation position of the first LF light distribution pattern can be adjusted to a correct position. Since the irradiation position can be adjusted to the correct position, distortion and blurring of the drawing pattern can be reduced.

Further, with the configuration in which the second RF light distribution pattern includes the second RF point and the first RF light distribution pattern includes the first RF point, the position of the first RF point included in the first RF light distribution pattern can be automatically adjusted on the basis of the second RF point included in the second RF light distribution pattern. The irradiation position of the low beam for irradiating the second RF light distribution pattern by the right headlamp 14R can be adjusted by periodic inspection or the like, so that the deviation of the irradiation position is assumed to be smaller than that of other lamps. Therefore, the position of the first RF point included in the first RF light distribution pattern can be automatically adjusted on the basis of the second RF point included in the second RF light distribution pattern of light with the low beam irradiated by the right headlamp 14R, whereby the irradiation position of the first RF light distribution pattern can be adjusted to a correct position. Since the irradiation position can be adjusted to the correct position, distortion and blurring of the drawing pattern can be reduced.

In addition, the illumination device can include the left-rear road surface drawing portion 18L configured to irradiate light having the LR light distribution pattern, the right-rear road surface drawing portion 18R configured to irradiate light having the RR light distribution pattern, and the center-rear road surface drawing portion 19C configured to irradiate light having the CR light distribution pattern. The illumination device can further include the detection unit configured to detect the LR light distribution pattern, the RR light distribution pattern, and the CR light distribution pattern, and an adjustment unit configured to adjust one or both of the LR light distribution pattern and the RR light distribution pattern.

With this configuration, the first LR point included in the LR light distribution pattern can be automatically adjusted on the basis of the second LR point included in the CR light distribution pattern, so that the irradiation position can be adjusted to the correct position. Since the irradiation position can be adjusted to the correct position, distortion and blurring of the drawing pattern can be reduced. In addition, on the basis of the second RR point included in the CR light distribution pattern, the first RR point included in the RR light distribution pattern can be automatically adjusted, whereby the irradiation position can be adjusted to a correct position. Since the irradiation position can be adjusted to the correct position, distortion and blurring of the drawing pattern can be reduced.

<Configuration Example>

As a configuration example, the illumination apparatus (illumination system in this exemplary embodiment) can include a first irradiation unit (the left road surface drawing portion 20L and the left-rear road surface drawing portion 18L in this exemplary embodiment, which also correspond to "drawing unit" in the presently disclosed subject matter) configured to irradiate light having a first light distribution pattern (the first LF light distribution pattern and the LR light distribution pattern in this exemplary embodiment) and a second irradiation unit (the right road surface drawing portion 20R and the right-rear road surface drawing portion 18R in this exemplary embodiment, which also correspond to "drawing unit" in the presently disclosed subject matter) configured to irradiate light having a second light distribution pattern different from the first light distribution pattern (the first RF light distribution pattern and the RR light distribution pattern in this exemplary embodiment, which also correspond to "first (second) drawing pattern" in the presently disclosed subject matter), wherein at least one of the first light distribution pattern and the second light distribution pattern can include a main pattern, and an auxiliary pattern (the first LF point, the second LF point, the first RF point, the second RF point, the first LR point, and the second LR point in this exemplary embodiment, which also correspond to "first (second) auxiliary pattern" in the presently disclosed subject matter).

As a configuration example, in the illumination device, the auxiliary pattern can be used for aligning the first light distribution pattern and the second light distribution pattern, and the first light distribution pattern and the second light distribution pattern can be combined to form a pattern different from the first light distribution pattern and the second light distribution pattern.

As a configuration example, the illumination device can include a changing unit (in the present exemplary embodiment, the changing unit 40, which also correspond to "irradiation-direction adjustment unit" in the presently disclosed subject matter) configured to change one or both of the irradiation position of the first light distribution pattern and the irradiation position of the second light distribution pattern.

As a configuration example, the illumination device can include a detection unit (in the present exemplary embodiment, the FO detection unit 21F and the RO detection unit 21R, and the SO detection unit) configured to detect any one or both of the first light distribution pattern drawn on a screen (in the present exemplary embodiment, the road surface or the screen) and the second light distribution pattern drawn on the screen, and an adjustment unit (in the present exemplary embodiment, the adjustment unit 34) configured to adjust one or both of the first light distribution pattern and the second light distribution pattern detected by the detection unit.

As a configuration example, the illumination device can include a third irradiation unit (in the present exemplary embodiment, the center-rear road surface drawing portion 19C) configured to irradiate light having a third light distribution pattern (in the present exemplary embodiment, the second LR light distribution pattern, the second RR light distribution pattern, and the CR light distribution pattern), and the adjustment unit can adjust any one or both of the first light distribution pattern and the second light distribution pattern on the basis of the third light distribution pattern.

As another configuration example representing the presently disclosed subject matter, the aforementioned illumination device can be considered as a pattern-drawing apparatus configured to draw a pattern and installed in a vehicle body, The pattern-drawing apparatus can include: a plurality of drawing units (20L, 20R, 18L, 18R, 19C) configured to irradiate light of a drawing image having a predetermined pattern on any of a road surface in a vicinity of the vehicle body and a virtual screen assumed to be disposed in a vicinity of the vehicle body; an irradiation-direction adjustment unit (34, 40) configured to shift a position of at least one of the irradiated drawing images by the drawing units. The plurality of drawing units can include: a first drawing unit configured to irradiate light having a first drawing pattern (e.g., LFPA1) which is a part of the predetermined pattern and a first auxiliary pattern (e.g., LFPO1) which is smaller than the predetermined pattern, and a second drawing unit configured to irradiate light having a second drawing pattern (e.g., LFPA2) which is different from the first drawing pattern and is another part of the predetermined pattern and a second auxiliary pattern (e.g., LFPO2) which is smaller than the predetermined pattern. The irradiation-direction adjustment unit is capable of moving at least one of the first drawing unit and the second drawing unit so that the first auxiliary pattern and the second auxiliary pattern are shifted to coincide with each other or be located with a predetermined positional relationship to combine the first drawing pattern and the second drawing pattern into the predetermined pattern.

Furthermore, the pattern-drawing apparatus (20L, 20R, 18L, 18R, 19C) as above can be installed in a vehicle periphery illumination device configured to include a light distribution illumination device (10L, 10R, 11L, 11R) configured to be installed in a vehicle body and irradiate light having a predetermined light distribution around the vehicle body, wherein the pattern-drawing apparatus is installed in a vicinity or inside of the light distribution illumination device.

The processing may be performed by recording a program for realizing the functions of the device (for example, the control unit 31) according to the exemplary embodiment described above on a computer-readable recording medium, and causing the computer system to read and execute the program recorded on the recording medium.

The "computer system" herein may include an operating system (OS) and also hardware such as peripheral devices.

The "computer-readable recording medium" herein refers to a writable nonvolatile memory such as a flexible disk, a magneto-optical disk, a ROM (read only memory), a flash memory, or the like, a portable medium such as a DVD (digital versatile disc), or a storage device such as a hard disk incorporated in a computer system.

Further, the "computer-readable recording medium" herein may include a recording medium that holds a program for a predetermined period of time, such as a volatile memory (for example, a dynamic RAM (DRAM)) in a computer system serving as a server or a client when the program is transmitted via a network such as the Internet or a communication line such as a telephone line.

The program may be transmitted from a computer system storing the program in a storage device or the like to another computer system via a transmission medium or by a transmission wave in the transmission medium. Herein, the "transmission medium" for transmitting the program refers to a medium having a function of transmitting information, such as a network (communication network) such as the Internet or a communication line (communication line) such as a telephone line.

Further, the above-mentioned program may be a program for realizing a part of the above-mentioned functions. Further, the above-mentioned program may be a so-called difference file (difference program) capable of realizing the above-mentioned functions in combination with a program already recorded in the computer system.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. An illumination device comprising:
   a first irradiation unit configured to irradiate light having a first light distribution pattern; and
   a second irradiation unit configured to irradiate light having a second light distribution pattern different from the first light distribution pattern, wherein
   the first light distribution pattern and the second light distribution pattern each include a main drawing pattern and an auxiliary drawing pattern configured to have an assisting function;
   a detecting unit configured to detect at least one of the main drawing patterns and auxiliary drawing patterns in the first light distribution and the second light distribution pattern to obtain drawing pattern information; and
   an adjustment unit configured to adjust at least one of the first light distribution pattern and the second light distribution pattern in view of the drawing pattern information detected by the detecting unit,
   the adjustment unit further configured to adjust at least one of the first light distribution pattern and the second light distribution pattern from a first position to a correct position, where the first position is different from the correct position in at least one of a vertical and horizontal location,
   the auxiliary drawing patterns are used for aligning the first light distribution pattern and the second light distribution pattern, and
   the first light distribution pattern and the second light distribution pattern are combined to form a pattern different from the first light distribution pattern and the second light distribution pattern.

2. The illumination device according to claim 1, further comprising a changing unit configured to change at least one of an irradiation position of the first light distribution pattern and an irradiation position of the second light distribution pattern.

3. The illumination device according to claim 1, further comprising:
   the detection unit configured to detect at least one of the first light distribution pattern drawn on a screen and the second light distribution pattern drawn on the screen; and
   the adjustment unit configured to adjust at least one of the first light distribution pattern and the second light distribution pattern detected by the detecting unit.

4. The illumination device according to claim 3, further comprising a third irradiating unit configured to irradiate light having a third light distribution pattern, and wherein
   the adjustment unit may adjust at least one of the first light distribution pattern and the second light distribution pattern on a basis of the third light distribution pattern.

5. A pattern-drawing apparatus configured to draw a pattern and installed in a vehicle body, comprising:
   a plurality of drawing units configured to irradiate light of a drawing image having a predetermined pattern on any of a road surface in a vicinity of the vehicle body and a virtual screen assumed to be disposed in the vicinity of the vehicle body; and
   an irradiation-direction adjustment unit configured to shift a position of at least one of the irradiated drawing images by the drawing units, wherein
   the plurality of drawing units include:
      a first drawing unit configured to irradiate light having a first drawing pattern which is a part of the predetermined pattern and a first auxiliary pattern which is smaller than the predetermined pattern, and
      a second drawing unit configured to irradiate light having a second drawing pattern which is different from the first drawing pattern and is another part of the predetermined pattern and a second auxiliary pattern which is smaller than the predetermined pattern,
   the irradiation-direction adjustment unit is configured to move at least one of the positions of the irradiated drawing images of the first drawing unit and the second drawing unit in at least one of a vertical direction and a horizontal direction so that the first auxiliary pattern and the second auxiliary pattern are shifted to coincide with each other or be located with a predetermined positional relationship to combine the first drawing pattern and the second drawing pattern into the predetermined pattern,
   the first auxiliary pattern irradiated by the first drawing unit and the second auxiliary pattern irradiated by the second drawing unit are each formed in a shape selected from the group consisting of a circle, an oval, a polygon, a shape derived from a circle or a polygon a part of which is eliminated, a shape constituted by at least one line segment, and combinations of any two or more of these shapes, and
   the irradiation-direction adjustment unit moves at least one of the positions of the irradiated drawing images of the first drawing unit and the second drawing unit, so that when the first auxiliary pattern and the second auxiliary pattern are shifted to coincide with each other, the first drawing pattern and the second drawing pattern are combined to form the predetermined pattern.

6. The pattern-drawing apparatus according to claim 5, wherein
   the predetermined pattern formed by combining the first drawing pattern and the second drawing pattern is a combination of a width pattern corresponding to a width of the vehicle body and a length pattern having a length longer than the width pattern and showing a length direction of the vehicle body, and
   the first drawing unit and the second drawing unit irradiate the first drawing pattern and the second drawing pattern, respectively, on the road surface in front of the vehicle body or in the rear of the vehicle body.

7. The pattern-drawing apparatus according to claim 5, wherein
the predetermined pattern formed by combining the first drawing pattern and the second drawing pattern is a combination of a width pattern corresponding to a width of the vehicle body and a length pattern having a length longer than the width pattern and showing a length direction of the vehicle body, and
the first drawing unit and the second drawing unit irradiate the first drawing pattern and the second drawing pattern, respectively, on the road surface in front of the vehicle body or in the rear of the vehicle body.

8. The pattern-drawing apparatus according to claim 5, wherein
the first drawing unit is disposed at a front portion of the vehicle body on one of a right side and a left side,
the second drawing unit is disposed at the front portion of the vehicle body on the other of the right side and the left side,
the first drawing pattern is a width pattern showing a width direction of the vehicle body, and
the second drawing pattern is a length pattern showing a length direction of the vehicle body.

9. The pattern-drawing apparatus according to claim 5, further comprising a vehicle outside detection unit configured to recognize an area where the first drawing unit and the second drawing unit irradiate light with the first drawing pattern and light with the second drawing pattern and detect the first auxiliary pattern and the second auxiliary pattern to generate and output a signal of information of the first auxiliary pattern and a signal of information of the second auxiliary pattern to the irradiation-direction adjustment unit, and wherein
the irradiation-direction adjustment unit acquires the signals outputted by the vehicle outside detection unit to move at least one of the positions of the irradiated drawing images of the first drawing unit and the second drawing unit so that the first drawing unit and/or the second drawing unit project respective light to a desired position.

10. The pattern-drawing apparatus according to claim 9, wherein
the signal of information outputted by the vehicle outside detection unit includes position information of the first auxiliary pattern and the second auxiliary pattern.

11. An illumination device configured to draw a pattern and installed in a vehicle body, comprising:
a left headlight unit configured to be disposed at a front portion of the vehicle body on a left side and include a first drawing unit configured to irradiate light having a first drawing image having at least a part of a predetermined pattern on a road surface or a screen assumed to be disposed in a vicinity of the vehicle body;
a right headlight unit configured to be disposed at a front portion of the vehicle body on a right side and include a second drawing unit configured to irradiate light having a second drawing image having at least another part of the predetermined pattern on the road surface or the screen; and
an irradiation-direction adjustment unit configured to shift a position of at least one of the irradiated drawing images by the first and second drawing units, wherein
the first drawing unit is configured to irradiate light having a first drawing pattern which is the part of the predetermined pattern and a first auxiliary pattern which is smaller than the predetermined pattern, and
the second drawing unit is configured to irradiate light having a second drawing pattern which is different from the first drawing pattern and is the another part of the predetermined pattern and a second auxiliary pattern which is smaller than the other predetermined pattern,
the irradiation-direction adjustment unit is configured to move at least one of the positions of the irradiated drawing images of the first drawing unit and the second drawing unit in at least one of a vertical direction and a horizontal direction so that the first auxiliary pattern and the second auxiliary pattern are shifted to coincide with each other or be located with a predetermined positional relationship to combine the first drawing pattern and the second drawing pattern into the predetermined pattern,
the first auxiliary pattern irradiated by the first drawing unit and the second auxiliary pattern irradiated by the second drawing unit are each formed in a shape selected from the group consisting of a circle, an oval, a polygon, a shape derived from a circle or a polygon a part of which is eliminated, a shape constituted by at least one line segment, and combinations of any two or more of these shapes, and
the irradiation-direction adjustment unit moves at least one of the positions of the irradiated drawing images of the first drawing unit and the second drawing unit, so that when the first auxiliary pattern and the second auxiliary pattern are shifted to coincide with each other, the first drawing pattern and the second drawing pattern are combined to form the predetermined pattern.

12. The illumination device according to claim 11, wherein
the predetermined pattern formed by combining the first drawing pattern and the second drawing pattern is a combination of a width pattern corresponding to a width of the vehicle body and a length pattern having a length longer than the width pattern and showing a length direction of the vehicle body, and
the first drawing unit and the second drawing unit irradiate the first drawing pattern and the second drawing pattern, respectively, on the road surface in front of the vehicle body or in the rear of the vehicle body.

13. The illumination device according to claim 11, further comprising a vehicle outside detection unit configured to recognize an area where the first drawing unit and the second drawing unit irradiate light with the first drawing pattern and light with the second drawing pattern and detect the first auxiliary pattern and the second auxiliary pattern to generate and output a signal of information of the first auxiliary pattern and a signal of information of the second auxiliary pattern to the irradiation-direction adjustment unit, and wherein
the irradiation-direction adjustment unit acquires the signals outputted by the vehicle outside detection unit to move at least one of the positions of the irradiated drawing images of the first drawing unit and the second drawing unit so that the first drawing unit and/or the second drawing unit project respective light to a desired position.

14. The illumination device according to claim 13, wherein
the signal of information outputted by the vehicle outside detection unit includes position information of the first auxiliary pattern and the second auxiliary pattern.

* * * * *